US012674511B2

(12) United States Patent
Klein et al.

(10) Patent No.: US 12,674,511 B2
(45) Date of Patent: Jul. 7, 2026

(54) PARKING LOCK ARRANGEMENT FOR A VEHICLE TRANSMISSION

(71) Applicant: ZF Friedrichshafen AG, Friedrichshafen (DE)

(72) Inventors: Patrick Klein, Langenargen (DE); Georg Seltmann, Friedrichshafen (DE); Tobias Miller, Waldburg (DE); Robert Strauch, Ravensburg (DE); Matthias List, Friedrichshafen (DE); Lars-Erik Meyer, Meersburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/037,109

(22) Filed: Jan. 25, 2025

(65) Prior Publication Data

US 2025/0243932 A1      Jul. 31, 2025

(30) Foreign Application Priority Data

Jan. 25, 2024     (DE) .......................... 102024200661.0

(51) Int. Cl.
   *F16H 63/34*          (2006.01)
(52) U.S. Cl.
   CPC ................................ *F16H 63/3433* (2013.01)
(58) Field of Classification Search
   CPC .......................... F16H 63/3433; F16H 63/3425
   See application file for complete search history.

(56) References Cited

U.S. PATENT DOCUMENTS

| | | | |
|---|---|---|---|
| 2009/0217493 A1* | 9/2009 | Greenhill | F16B 21/183 24/457 |
| 2014/0116167 A1* | 5/2014 | Aizawa | F16C 33/1075 74/89.17 |
| 2018/0202485 A1* | 7/2018 | Hill | F16C 3/023 |
| 2019/0360579 A1* | 11/2019 | Hannet | F16H 57/08 |

(Continued)

FOREIGN PATENT DOCUMENTS

| | | |
|---|---|---|
| DE | 29501158 U1 | 1/1995 |
| DE | 102005006407 A1 | 9/2005 |
| DE | 102008000263 A1 | 12/2008 |

(Continued)

OTHER PUBLICATIONS

German Search Report for Application No. 102024200661.0 Dated Dec. 19, 2024.

*Primary Examiner* — Lori Wu
(74) *Attorney, Agent, or Firm* — Dority & Manning, P.A.

(57)          ABSTRACT

A parking lock arrangement for a motor vehicle transmission includes a parking lock gear arranged on a transmission shaft by sliding onto a guide region (7) defined on the radially outward side of the component (2) via a guide region (6) formed on the radially inward side of the parking lock gear (4). In the final position, a recess (14) extending peripherally around the guide region (6) of the parking lock gear (4) has been axially brought into overlap with a recess (13) extending peripherally around the guide region (7) of the component. The parking lock gear (4) and the component are securable against each other via a securing ring. The securing ring engages partially radially into the recess (14) in the guide region (6) on the parking lock gear (4) and partially radially into the recess (13) in the guide region (7) on the component.

19 Claims, 15 Drawing Sheets

(56)          References Cited

U.S. PATENT DOCUMENTS

2021/0033133  A1      2/2021   Breen et al.
2021/0048104  A1*     2/2021   Grunwald  ........... F16H 63/3425

FOREIGN PATENT DOCUMENTS

DE          102016216793  A1      3/2018
DE          102021133004  A1      6/2023
JP            2004324828  A   *  11/2004

* cited by examiner 72     74

73

PARKING LOCK ARRANGEMENT FOR A VEHICLE TRANSMISSION

CROSS-REFERENCE TO RELATED APPLICATION

The present application is related and has right of priority to German Patent Application No. DE 102024200661.0 filed on Jan. 25, 2024, which is incorporated by reference in its entirety for all purposes.

TECHNICAL FIELD

The invention relates generally to a parking lock arrangement for a motor vehicle transmission. The invention also relates generally to a motor vehicle transmission having a parking lock system.

BACKGROUND

In motor vehicle transmissions having starting components, such as hydrodynamic torque converters, or having hydraulically actuated shift elements, it is not readily possible to secure the vehicle from rolling away in addition to a parking brake, since a mechanical connection of a prime mover to driven vehicle wheels can no longer be maintained once the prime mover has been switched off and the hydraulic pressure subsequently drops. For this reason, separate parking locks are usually provided in such motor vehicle transmissions, which, when actuated, mechanically block the motor vehicle transmission. To achieve this, an output-side transmission shaft is usually rotationally fixed at a housing of the motor vehicle transmission, such that this shaft and thus also the driven wheels are prevented from rotating when the parking lock is activated. The rotational fixation is often implemented via a pivotably mounted locking pawl, which, when the parking lock is activated, can engage into tooth gaps on a parking lock gear, which is usually non-rotatably connected within a parking lock arrangement to the shaft to be rotationally fixed. The parking lock gear is then also to be axially secured on the shaft, for the purpose of which a securing ring is also frequently utilized.

DE 10 2021 133 004 A1 describes a parking lock arrangement in which a parking lock gear is arranged on a component in the form of a shaft section of a planet carrier. The parking lock gear is provided with a guide region on the radially inward side thereof, which guide region is present as a through-hole in the parking lock gear. Via this guide region, the parking lock gear is slid in the axial direction onto a guide region defined on the radially outward side of the shaft section against an abutment shoulder into a final position in which the parking lock gear is to be axially positioned on the shaft section. The parking lock gear is prevented from axially migrating in the one axial direction via the abutment shoulder and in the other axial direction via a securing ring which, for this purpose, is positioned radially between the parking lock gear and the shaft section in a securing position and engages partially radially into a recess in the guide region on the parking lock gear and partially radially into a recess in the guide region on the shaft section.

SUMMARY

Example aspects of the present invention provide a parking lock arrangement in which a parking lock gear is reliably axially secured in at least one axial direction via a securing ring, wherein this securing is also to be achieved in a radially compact manner.

According to example aspects of the invention, a parking lock arrangement includes a parking lock gear, which is arranged on a component, in particular a transmission shaft, and, for this purpose, has been slid onto a guide region defined on the radially outward side of the component into a final position via a guide region formed on the radially inward side of the parking lock gear. In the final position, a recess extending peripherally around the guide region of the parking lock gear has been brought axially into overlap with a recess extending peripherally around the guide region of the component, wherein the parking lock gear and the component in the final position can be secured against each other in at least one axial direction, in that a securing ring is positioned radially between the parking lock gear and the component in a securing position in which the securing ring engages partially radially into the recess in the guide region on the parking lock gear and partially radially into the recess in the guide region on the component.

In the parking lock arrangement according to example aspects of the invention, a parking lock gear is therefore positioned on a component which is preferably a transmission shaft of a motor vehicle transmission. The positioning is achieved by sliding the parking lock gear onto a guide region of the component into a final position via a guide region, wherein the guide region on the parking lock gear is defined on the radially inward side of the parking lock gear, whereas the guide region on the component is formed on the radially outward side thereof. In particular, the guide region of the parking lock gear is formed on a radially inward side of a hub-like section of the parking lock gear, wherein the guide region is preferably defined via a passage in this section. Most particularly preferably, the passage is in the form of a through-hole which, in particular, is of a stepped design and therefore has different inner diameters. The guide region of the component is formed, in particular, by a shaft section of the component, which shaft section can be composed of multiple portions having different outer diameters.

The parking lock gear is slid onto the component into a final position, wherein, as set forth herein, the "final position" is understood to be a position which the parking lock gear is to assume on the component in a fully assembled state.

The parking lock gear can be prevented from axially migrating on the component out of the final position and thus leaving the final position in at least one axial direction by a securing ring which, for this purpose, is arranged in a securing position once the parking lock gear has been positioned on the component in the final position. In this position, the securing ring engages radially partially into a recess which is formed in the guide region of the parking lock gear and radially partially into a recess which is formed in the guide region of the component and, in the final position, axially overlaps with the recess in the guide region of the parking lock gear. The axial migration is interlockingly prevented in the at least one axial direction by the securing ring, since the securing ring in the securing position thereof is radially engaged in both recesses simultaneously. According to example aspects of the invention, the securing ring can implement a securing function in one axial direction or in both axial directions.

Preferably, the parking lock gear and the component are also connected to each other for conjoint rotation at the guide regions thereof, wherein this corotational connection is preferably implemented via driving tooth systems with which the parking lock gear and the component are provided on the guide regions thereof. For this purpose, a driving tooth system is formed on the parking lock gear in particular as a counterpart to a driving tooth system, wherein, more preferably, the driving tooth systems are present as splines which mesh with one another when the parking lock gear is axially slid onto the component.

Example aspects of the invention encompass the technical teaching that the securing ring is in the form of a slotted, radially elastic snap ring, the cross-sectional geometry of which is larger in the axial extension thereof than in the radial extension thereof. In other words, the securing ring is therefore present as a slotted, radially elastic snap ring, wherein a geometry of the cross-section of this snap ring is larger in size in the axial direction than in the radial direction.

Such an example embodiment of a parking lock arrangement has the advantage that, due to the design as a snap ring, the parking lock gear can be axially secured on the component with easy installation, wherein this securing function is also distinguished by a small radial space requirement due to the configuration of the snap ring. As a result, a load capacity of the parking lock arrangement can also be increased, since the recesses in the parking lock gear and in the component can each have a reduced radial depth, such that a tension-optimized configuration is possible.

The snap ring is slotted and radially elastic in the present case in order to ensure, within the framework of installing the snap ring, that the snap ring is positioned in the securing position by intermediate radial preloading of the snap ring and, if necessary, that a radial preloading of the snap ring is also maintained in the securing position itself. Preferably, a radial preloading of the snap ring is also achieved in the securing position of the snap ring, wherein the snap ring in the securing position thereof preferably preloads radially outwardly into the groove in the guide region of the parking lock gear, such that the snap ring acts in the manner of a bore ring in this case. Alternatively, it would also be conceivable within the scope of example aspects of the invention that the snap ring in the securing position thereof preloads radially inwardly into the groove in the component or, however, that the snap ring in the securing position thereof is simultaneously inserted radially into both recesses in an essentially untensioned manner.

Preferably, the cross-sectional geometry of the snap ring is in the form of a polygon and, in particular, is quadrangular, wherein the cross-sectional geometry can be defined at least predominantly by a purely axially extending side and a side orthogonal thereto, which extends purely radially and is shorter than the purely axially extending side. Due to this, therefore, rectangular configuration of the cross-sectional geometry, the larger size in the axial direction than in the radial direction can be achieved and, simultaneously, a reliable securing function can be achieved. In a quadrangular configuration of the cross-sectional geometry, the cross-sectional geometry can also be defined at least predominantly by one first side and one second side, wherein the first side extends in the radial direction and to a greater extent in comparison thereto in the axial direction, whereas the second side extends orthogonally with respect to the first side and is shorter than the first side. In this cross-section as well, which therefore extends obliquely, the required dimensioning can be achieved in combination with a reliable securing function. Alternatively, the quadrangle could also be in the form of a trapezoid.

Within the scope of example aspects of the invention, it would also be conceivable to form the cross-sectional geometry with a flattened circle, wherein the flattening of the circle extends at least predominantly in an axial direction. Further alternatively, the cross-sectional geometry of the snap ring could also be crescent-shaped, wherein tips of the crescent-shaped cross-sectional geometry are oriented at least predominantly in a radial direction. Advantages are also achieved in these example variants with respect to the securing function and with respect to the radial dimensions of the thusly configured snap ring.

A snap ring according to one of the above-described example variants could be produced by first producing the particular cross-sectional geometry in a shaping manner, for example, by rolling, and then winding into a circle with a precise profile guide. For the obliquely extending cross-section, an appropriate target angle of the inclination of the cross-sectional geometry would then still need to be implemented.

According to one advantageous example embodiment of the invention, in one of the guide regions, the recess is in the form of a receiving groove which is axially delimited on both sides and has a dimension which allows the snap ring to plunge completely into the receiving groove by radial preloading into an installation position. Advantageously, as a result, the snap ring can be pressed completely into the receiving groove during assembly of the parking lock arrangement and, in this case, as the parking lock gear is slid onto the component. As a result, the parking lock gear and the component can be easily positioned with respect to one another in the final position. This is the case because, due to this configuration of the recess in the one guide region, the snap ring can be intermittently completely accommodated in the recess in the course of assembly, which recess is in the form of a receiving groove. Since the receiving groove is also axially delimited on both sides, the snap ring is also prevented from axially migrating out of the receiving groove. Preferably, the receiving groove is delimited on each axial side by one groove flank on each side.

In one example development of the aforementioned example embodiment, the other guide region also defines an installation contour for the snap ring, which installation contour has an axial pre-installation section, which has a pre-installation diameter. The pre-installation diameter is configured to accommodate the snap ring in a pre-installation position on the other guide region. In the installation contour, an axial installation section is also defined in an axial slide-on direction in which the parking lock gear is to be axially slid onto the component into the final position, downstream from the axial pre-installation section and upstream from the recess in the other guide region, which axial installation section is provided with an installation diameter which effects a radial preloading of the snap ring in the installation position thereof when the snap ring is axially positioned on the installation section. A second groove flank of the receiving groove lying axially in the slide-on direction has a radial extension at which the snap ring radially overlaps with this groove flank when the snap ring is in the pre-installation position thereof, such that, as the parking lock gear is slid onto the component into the final position, the snap ring accommodated on the pre-installation section comes to rest axially against the groove flank and, as a result, axially moves in the course of the sliding-on process from the pre-installation section onto the installation section and therefore radially preloads into the installation position thereof into the receiving groove.

In this configuration of the other guide region, the snap ring can be transferred into the securing position thereof with low installation effort during assembly of the parking lock arrangement. This is the case because the snap ring is simply placed on the pre-installation section prior to the parking lock gear being slid on. The snap ring is then transferred into the securing position thereof due to a forced guidance of the snap ring on the installation contour and the groove flank during the sliding-on process due to the configuration of the installation contour on the other guide region in interaction with the receiving groove in the one guide region. Thus, the snap ring gets caught on the second groove flank of the receiving groove lying axially in the slide-on direction during the sliding-on process, is then axially displaced on the installation contour from the pre-installation section onto the installation section and, as a result, plunges completely into the receiving groove. The other guide region can then be axially displaced further relative to the snap ring until the snap ring axially overlaps with the recess in the other guide region. Then, the snap ring can migrate into the securing position thereof and thus implement the axial securing function. Preferably, the pre-installation diameter is selected such that the snap ring is preloaded even prior to the placement thereof on the pre-installation section.

Alternatively to the aforementioned example embodiment, in one example design option of the invention, the receiving groove is provided for accommodating the snap ring in a pre-installation position in which the snap ring is positioned axially between the groove flanks, which axially delimit the receiving groove, and protrudes radially at least partially into the receiving groove. The other guide region defines an installation contour for the snap ring, which installation contour has an axial installation section which is positioned upstream from the recess in the other guide region in an axial slide-on direction in which the parking lock gear is to be axially slid onto the component into the final position. The axial installation section also has an installation diameter. The installation diameter is selected such that the snap ring, which is axially positioned between the groove flanks, radially preloads into the installation position thereof into the receiving groove when axially overlapping with the installation section as the parking lock gear is axially slid onto the component. As a result thereof as well, an installation of the snap ring in the securing position thereof as the parking lock gear is slid onto the component can be configured in a simple and simultaneously reliable manner.

In one example development of the aforementioned example embodiment, the second groove flank lying in the axial slide-on direction has a profile which changes in the axial and the radial directions. As a result, in particular when a snap ring is used which has an obliquely extending cross-sectional geometry, this yields a more accurate positioning of the snap ring in the receiving groove, such that the snap ring is then carried along to a lesser extent as the parking lock gear is slid on and, as a result, the parking lock gear can be more accurately positioned in the final position.

Alternatively or additionally, when a snap ring is used which has an obliquely extending cross-sectional geometry, the installation section can be in the form of a bevel, which bevel is flatter than an angle of the inclination of the cross-sectional geometry. Therefore, the contact between the installation section and the snap ring always takes place first at the highest point of the obliquely extending cross-sectional geometry, such that the snap ring cannot escape the groove in the radial direction.

In the aforementioned example variants, the recess in the other guide region in particular directly follows the installation section in the axial direction. As a result, when the parking lock gear is slid onto the component into the final position, the snap ring can transition into the securing position thereof immediately following the installation section. Preferably, the installation section transitions into the recess in the form of a bevel. Advantageously, a relaxation of the snap ring is assisted via this bevel.

In the above-described example variants, a respective transition between axially adjacent sections of the installation contour can each be in the form of a bevel. This has the advantage that, as a result, the snap ring is prevented from migrating from the one section onto the other section of the installation contour as the parking lock gear is slid on. In addition, undercuts can also be formed, in order to prevent the snap ring from remaining stuck during the installation.

In one example development of one of the aforementioned example variants, the other guide region is provided with a driving tooth system on the installation section, which driving tooth system is configured as a counterpart to a driving tooth system which is provided on the one guide region axially next to the receiving groove and is meshed with the driving tooth system of the other guide region in the final position. As a result, a corotational connection can be formed between the parking lock gear and the component in the final position. In addition, in the example variant in which the snap ring in the pre-installation position thereof is positioned in the receiving groove axially between the groove flanks, a reliable positioning of the snap ring can be achieved as the parking lock gear is slid on, since tip diameters of the driving tooth systems radially overlap.

According to another example embodiment of the invention, the guide regions of the parking lock gear and of the component are provided with centering sections which are formed as counterparts to one another. As a result, as the parking lock gear is slid onto the component, the two components can be centered with respect to one another, which facilitates the assembly. In one development of this example embodiment and in combination with the example variant of the invention, in which an installation contour having a pre-installation section and an installation section is implemented on the other guide region, a centering section of the other guide region is defined with respect to the installation contour axially between the pre-installation section and the installation section. The centering section is then provided with a centering diameter lying between the pre-installation diameter and the installation diameter. Optimal centering can be achieved as a result.

Within the scope of example aspects of the invention, it is also conceivable, however, that an installation aid, such as a centering sleeve, is used to center the parking lock gear and the component during the process of sliding-on into the final position.

According to one example design option of the invention, the parking lock gear in the final position rests in a first axial direction against an abutment shoulder, which extends in a radially outward direction and peripherally around the component. The parking lock gear is then prevented from migrating out of the final position in a second axial direction, in that, when parking lock gear migrates in the second axial direction, the snap ring comes to rest against one first support shoulder, which is formed by the recess in the component facing axially in the direction of the abutment shoulder, and axially against one second support shoulder, which is formed by the recess in the parking lock gear facing axially in the second axial direction. Advantageously, as a result, the axial securing of the parking lock gear and of the component in the final position can be configured in a reliable manner. In particular, one of the recesses is in the form of a receiving groove which is axially delimited on both sides, whereas the other recess is delimited only in one axial direction and is accessible in the axial direction from the outside. This also yields the possibility of transferring the snap ring out of the securing position thereof into a position, preferably into the installation position thereof, and, as a result, of also being able to disassemble the parking lock gear. It is also advantageous when the recess which is accessible in the axial direction from the outside is axially lengthened beyond the receiving groove, in order to achieve an overhang for the snap ring in the securing position thereof and thus to make it difficult for the snap ring to migrate.

As an alternative to the aforementioned example design option, the parking lock gear is prevented from migrating out of the final position in both axial directions via the snap ring, for the purpose of which the recesses in the parking lock gear and in the component are in the form of grooves, each of which is axially delimited on both sides by groove flanks acting as support shoulders for the snap ring, such that the snap ring comes to rest axially against one of the respective groove flanks of the respective groove depending on the respective axial direction of the migration. As a result thereof as well, the parking lock gear can be reliably axially secured on the component in both axial directions.

In a combination of the aforementioned example variant with the example embodiment, according to which the one recess is in the form of a receiving groove, the groove in the other guide region is then accessible from the outside from one axial side, in that the support shoulder of this groove lying on this axial side is interrupted in some areas in the circumferential direction. Via this axial accessibility, the snap ring can be acted upon in the axial direction from the outside and thus disassembly of the parking lock gear is made possible. The interruption of this groove in some areas in the circumferential direction can be implemented via forged pockets or open segments.

Within the scope of example aspects of the invention, a disassembly can be carried out in that, using an installation tool such as one or more pry bars or an installation sleeve, the snap ring can be preloaded into the installation position thereof and thus the axial mobility of the parking lock gear with respect to the component in the at least one axial direction is enabled again.

Within the scope of example aspects of the invention, the guide regions of the parking lock gear and of the component can also be used to feed lubricant, wherein lubricant, which is, in particular, lube oil, can be fed between the guide regions on the part of the parking lock gear in a radially inward direction or via a supply bore on the part of the component in a radially outward direction. Lubricant can be fed via an impact or an opening in the slotted snap ring. In particular, tooth engagements between driving tooth systems of the parking lock gear and the component can be lubricated in the process, wherein lubricant can also be fed to further components such as bearing points.

Example aspects of the invention also relate to a motor vehicle transmission which is provided with a parking lock arrangement according to one or more of the above-described example variants. This motor vehicle transmission can be, in particular, a transmission of an electrically driven motor vehicle axle.

BRIEF DESCRIPTION OF THE DRAWINGS

Advantageous example embodiments of the invention, which are explained in the following, are shown in the drawings, in which.

DETAILED DESCRIPTION

Figure 1:
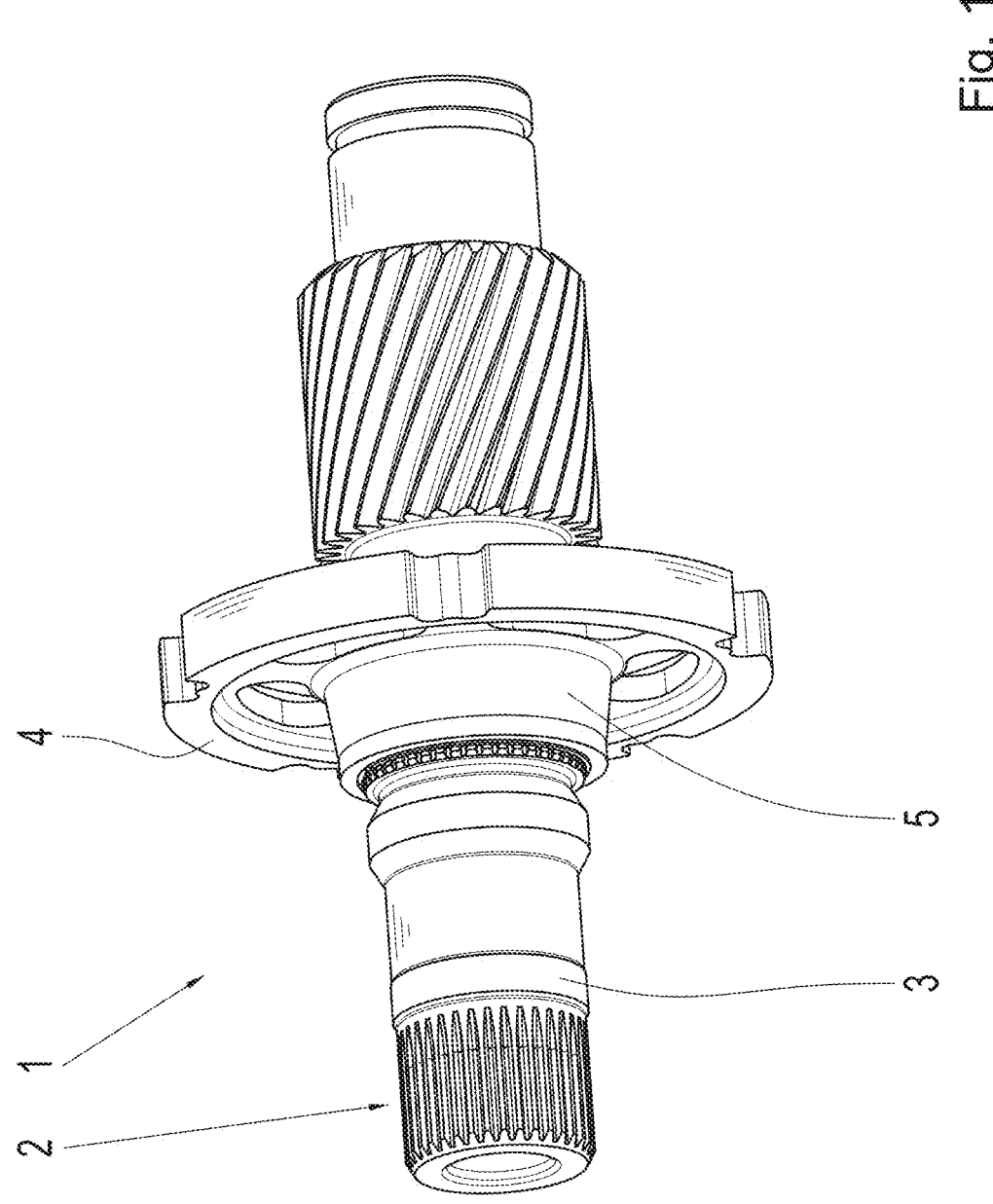
FIG. 1 shows a perspective view of a parking lock arrangement according to one example embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a perspective view of a parking lock arrangement 1 according to example aspects of the invention, which parking lock arrangement is part of a parking lock (not shown in greater detail otherwise), by which a component 2 in the form of a transmission shaft 3 can be rotationally fixed when a parking lock function is implemented. Within the parking lock arrangement 1, a parking lock gear 4 is located on the transmission shaft 3 in an axial final position shown in FIG. 1 and is connected to the transmission shaft 3 for conjoint rotation. As is apparent in particular with reference to the exploded view in FIG. 2 and in the sectional view in FIG. 3, the parking lock gear 4 has a hub section 5, by which the parking lock gear 4 is slid onto the transmission shaft 3 into the final position and which, for this purpose, defines a guide region 6 on a radially inward side, which guide region is in the form of a passage. For the purpose of accommodating the parking lock gear 4, a guide region 7 is formed on the transmission shaft 3 in a radially outward direction, which guide region is present as a shaft section of the transmission shaft 3.

The corotational connection between the parking lock gear 4 and the transmission shaft 3 is established via driving tooth systems 8 and 9 which are formed in the guide regions 6 and 7 on the parking lock gear 4 and the transmission shaft 3 and are meshed in the final position. This is apparent, in particular, in FIG. 3. On the transmission shaft 3, the guide region 7 is delimited by a shaft shoulder 10, by which a circumferential abutment shoulder 11 is formed on the side of the guide region 7 in the axial direction. The parking lock gear 4 lies axially against this abutment shoulder 11 in the final position, such that the parking lock gear 4 is also prevented from axially migrating out of the final position in this axial direction by the abutment shoulder 11.

Figure 2:
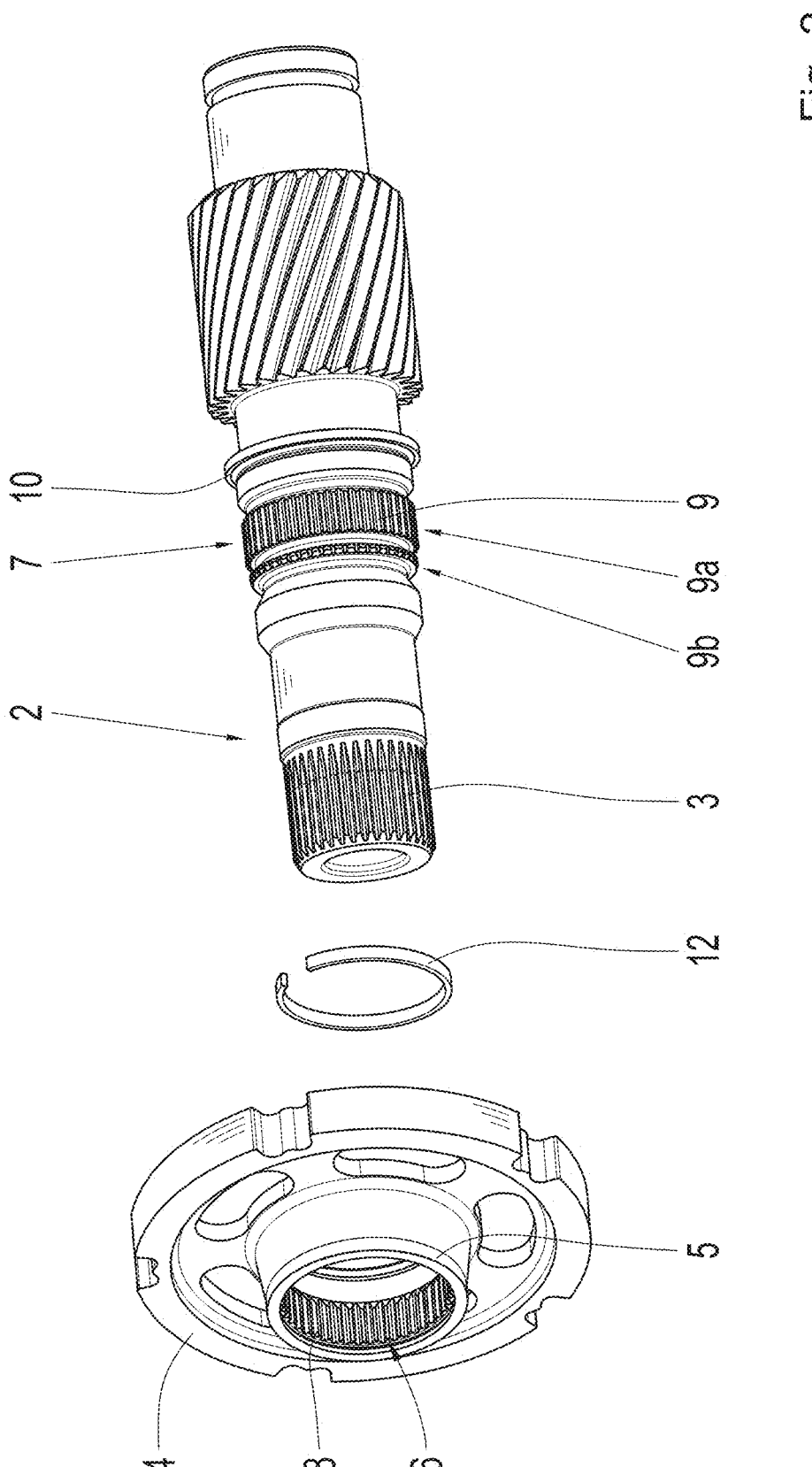
FIG. 2 shows an exploded view of the parking lock arrangement from FIG. 1.
Figure 3:
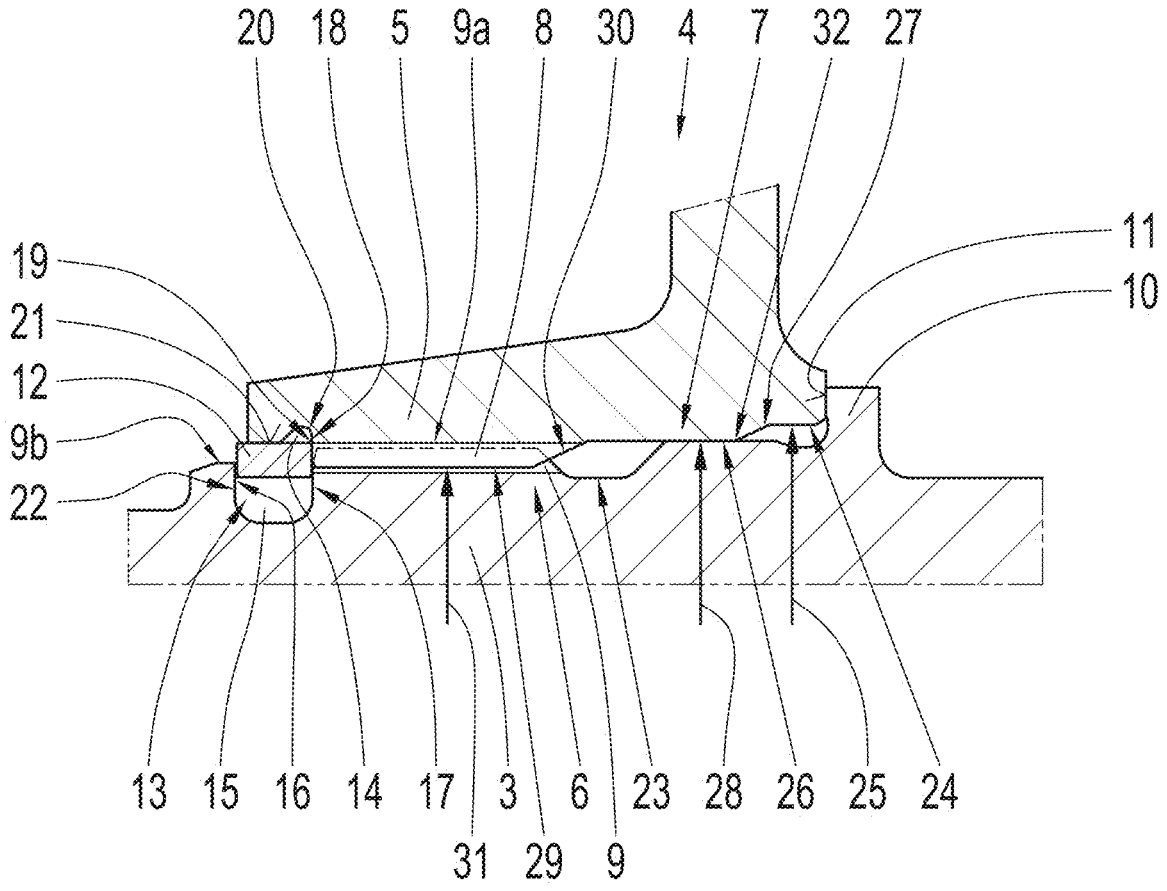
FIG. 3 shows a sectional view of one region of the parking lock arrangement from FIG. 1.

In an axial direction opposite thereto, the parking lock gear 4 is prevented from axially migrating out of the end position via a snap ring 12 which—as is apparent, in particular, in FIG. 2—is slotted and radially elastic and, in a securing position shown in FIG. 3, interlockingly prevents the axial migration of the parking lock gear 4. For this purpose, the snap ring 12 in the securing position thereof engages radially partially into a recess 13 in the guide region 7 and radially partially into a recess 14 in the guide region 6, such that the snap ring 12 in the securing position thereof lies radially partially in the recess 13 as well as radially partially in the recess 14. For this purpose, the recesses 13 and 14 overlap in the final position, as is apparent in FIG. 3.

Whereas the recess 13 is in the form of a receiving groove 15 which has a U-shaped cross-section and extends peripherally around the guide region 7 and is axially delimited on both sides by groove flanks 16 and 17, the recess 14 extends peripherally around one axial end of the hub section 5 and is open towards this axial end. Axially opposite thereto, the recess 14 is delimited via a projection 18 which forms a support shoulder 19 for the snap ring 12 and transitions into a radial contact surface 21 of the recess 14 via an undercut 20. Against this contact surface 21, the snap ring 12 in the securing position thereof is preloaded in a radially outward direction, such that the snap ring 12 is thus arranged as a bore ring.

In the securing position, the snap ring 12 secures the parking lock gear 4 on the transmission shaft 3 in the axial direction, in that the snap ring 12 is axially supported on the part of the parking lock gear 4 against the support shoulder 19 and is axially supported on the part of the transmission shaft 3 against a support shoulder 22 formed by the groove flank 16.

As is apparent, in particular, in FIG. 3, the snap ring 12 has a rectangular cross-sectional geometry which has a greater extension in the axial direction than in the radial direction. As a further consequence thereof, the recesses 13 and 14 can both be radially more compact, which allows for a tension-optimized configuration of the recesses 13 and 14 on the part of the parking lock gear 4 and on the part of the transmission shaft 3. The receiving groove 15 forming the recess 13 is configured with respect to the dimension thereof such that the snap ring 12 can be plunged completely into the receiving groove 15 via radial preloading and, consequently, no longer protrudes with respect to the receiving groove 15 in a radially outward direction.

In addition to the recess 14, an installation contour 23 is also defined on the guide region 6, via which installation contour the positioning of the snap ring 12 in the securing position thereof is brought about in interaction with the guide region 7 when the parking lock gear 4 is slid axially onto the transmission shaft 3 into the final position. Part of this installation contour 23 is an axial pre-installation section 24 which is the first formation in an axial slide-on direction, in which the parking lock gear 4 is axially slid onto the transmission shaft 3 into the final position, and has a pre-installation diameter 25. Following the pre-installation section 24 in the slide-on direction, a centering section 26 is formed, into which the pre-installation section 24 transitions via a bevel 27 and which has a centering diameter 28. This centering diameter 28 is smaller than the pre-installation diameter 25.

On a side of the centering section 26 facing away from the pre-installation section 24 in the axial direction, the installation contour 23 is provided with an installation section 29 into which the centering section 26 transitions via a bevel 30 and in which the driving tooth system 8 is formed. An installation diameter 31 of the installation section 29 is defined by the tip diameter of the driving tooth system 8, which installation diameter 31 is smaller than the centering diameter 28. In addition, the installation diameter 31 is axially separated from the recess 14 via the projection 18, which recess is therefore formed axially directly adjacent to the installation section 29.

With respect to the guide region 7 of the transmission shaft 3, the receiving groove 15 is formed axially directly adjacent to the driving tooth system 9. The driving tooth system 9 consists of two sections 9a and 9b. The receiving groove 15 is positioned upstream from the driving tooth system section 9a and downstream from the driving tooth system section 9b in the slide-on direction. In addition, another centering section 32 is formed in the guide region 7, which centering section is formed downstream from the driving tooth system 9 in the slide-on direction.

The parking lock arrangement 1 is preferably assembled in multiple individual steps which are shown in FIGS. 4A to 4L. At the beginning of the assembly process (FIG. 4A), the parking lock gear 4 is placed via the installation section 29 of the guide region 6 thereof onto a centering section 33 which is formed on the guide region 7 of the transmission shaft 3 upstream from the receiving groove 15 in the slide-on direction. In addition, the snap ring 12 is accommodated on the pre-installation section 24, preferably with a slight radial preloading of the snap ring 12.

Figure 4A:
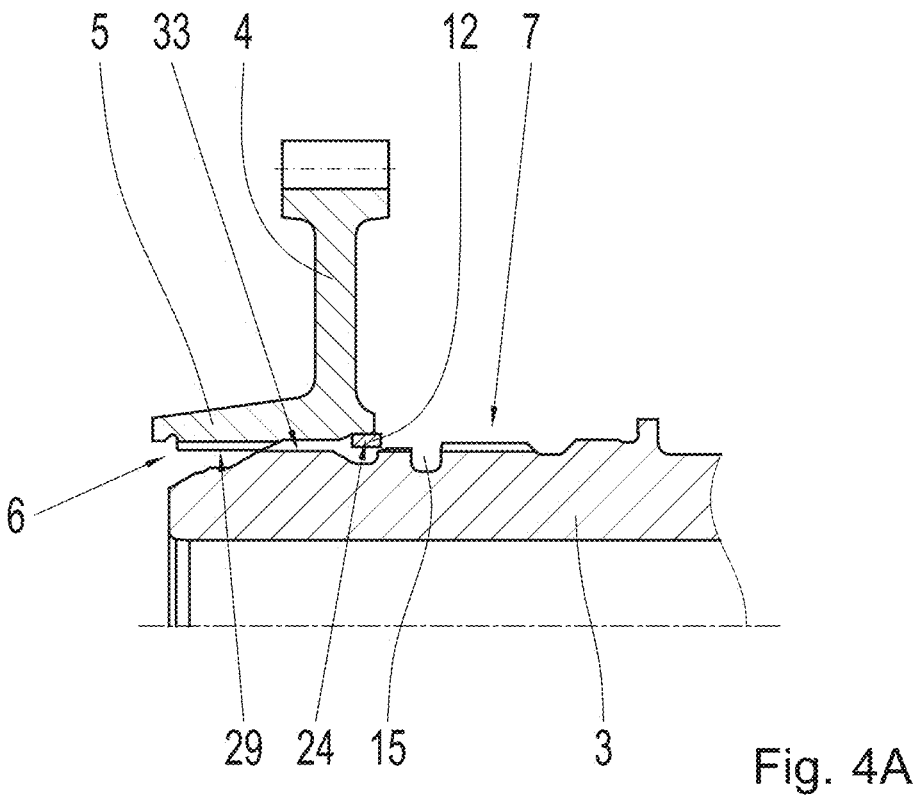
FIGS. 4A to 4L show sectional views of individual steps to assemble the parking lock arrangement from FIG. 1.
Figure 4B:
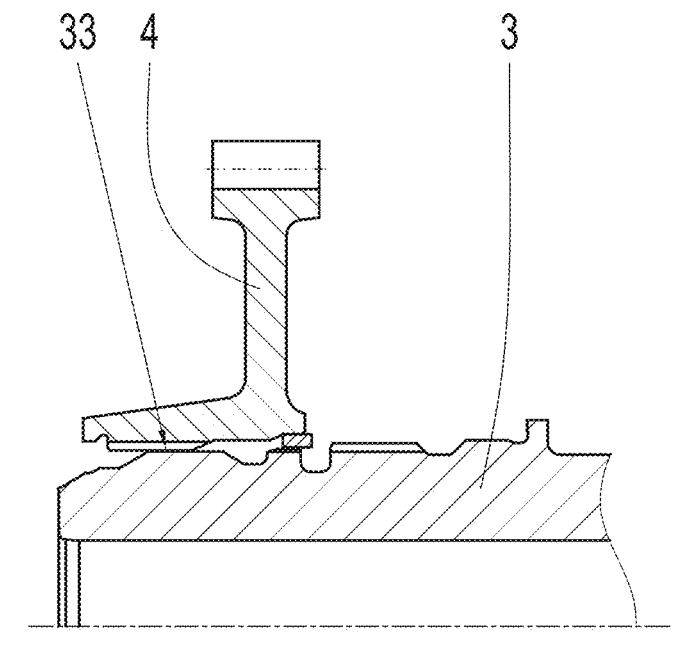
Figure 4C:
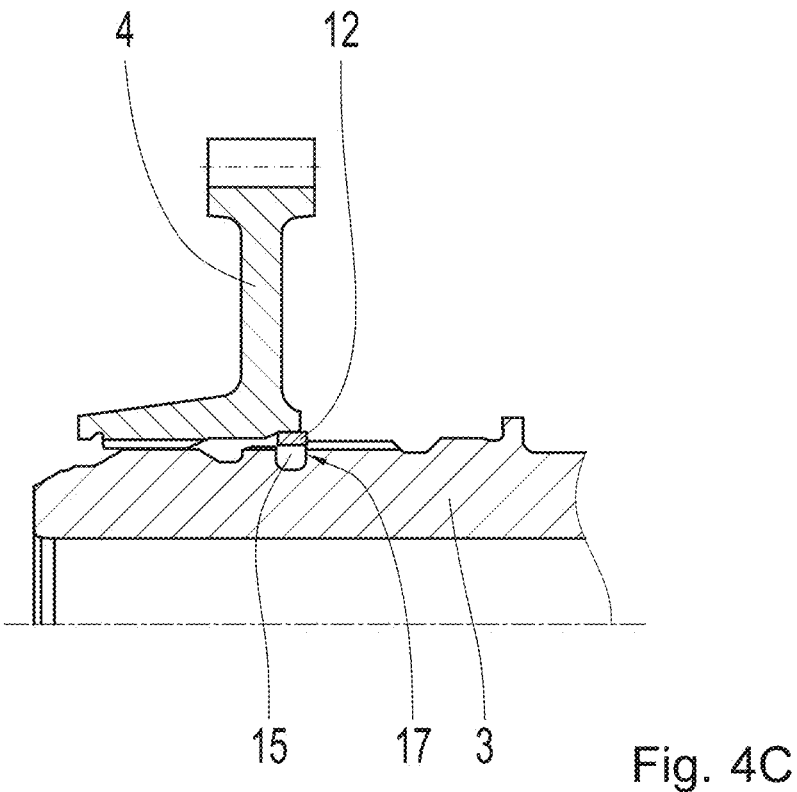
Figure 4D:
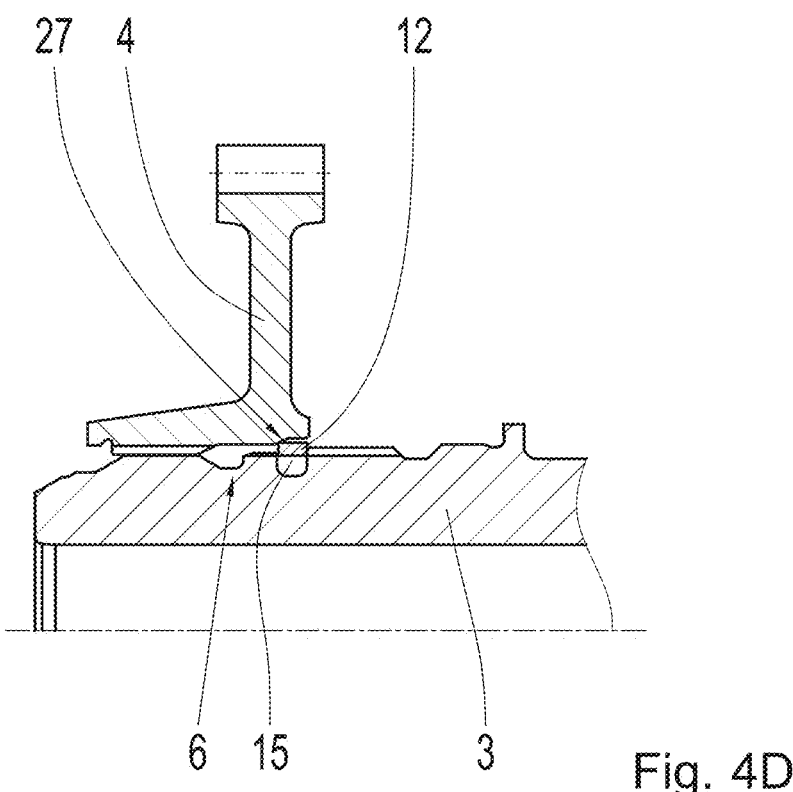
Figure 4E:
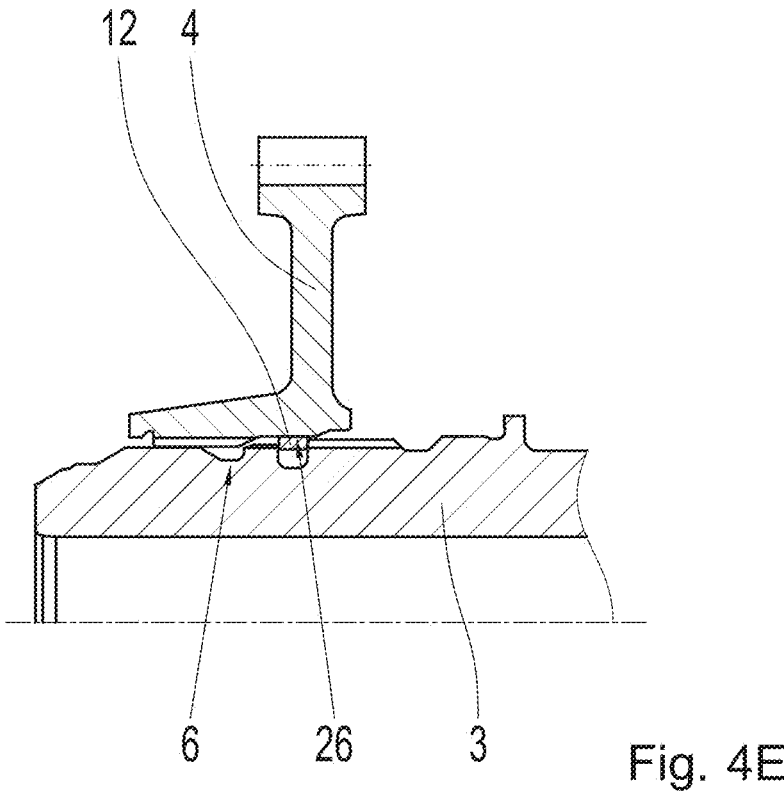

The parking lock gear 4 is then slid onto the transmission shaft 3 (FIG. 4B) in the slide-on direction with guidance on the centering section 33, wherein, at a certain displacement of the parking lock gear 4, the snap ring 12 axially makes contact with the groove flank 17 of the receiving groove 15, which groove flank is formed, for this purpose, having a radial extension at which the snap ring 12 radially overlaps with the groove flank 17 when positioned on the pre-installation section 24. When this contact is made, the snap ring 12 then axially overlaps with the receiving groove 15. This is shown in FIG. 4C.

Figure 4F:
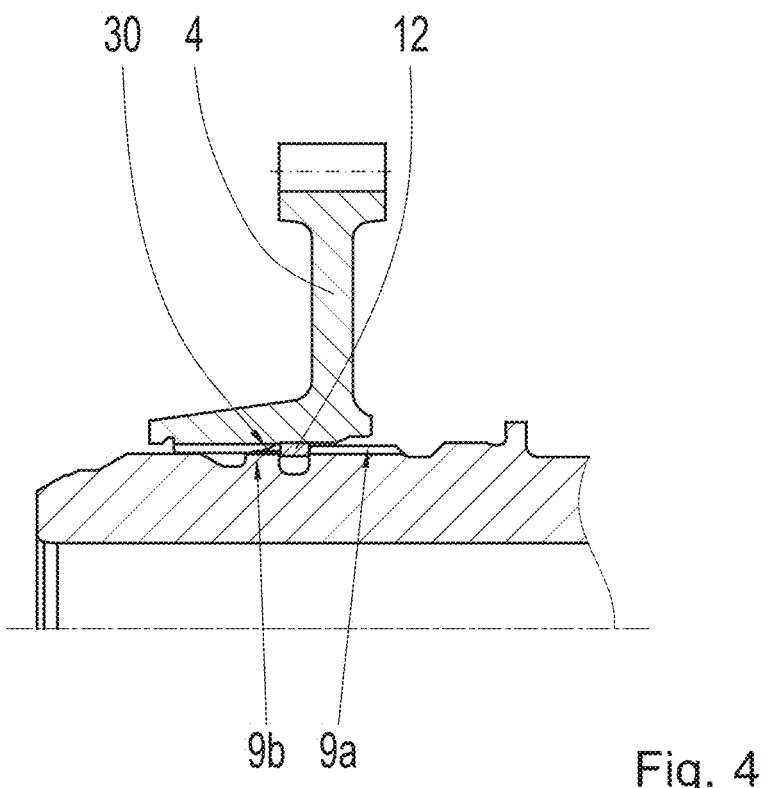
Figure 4G:
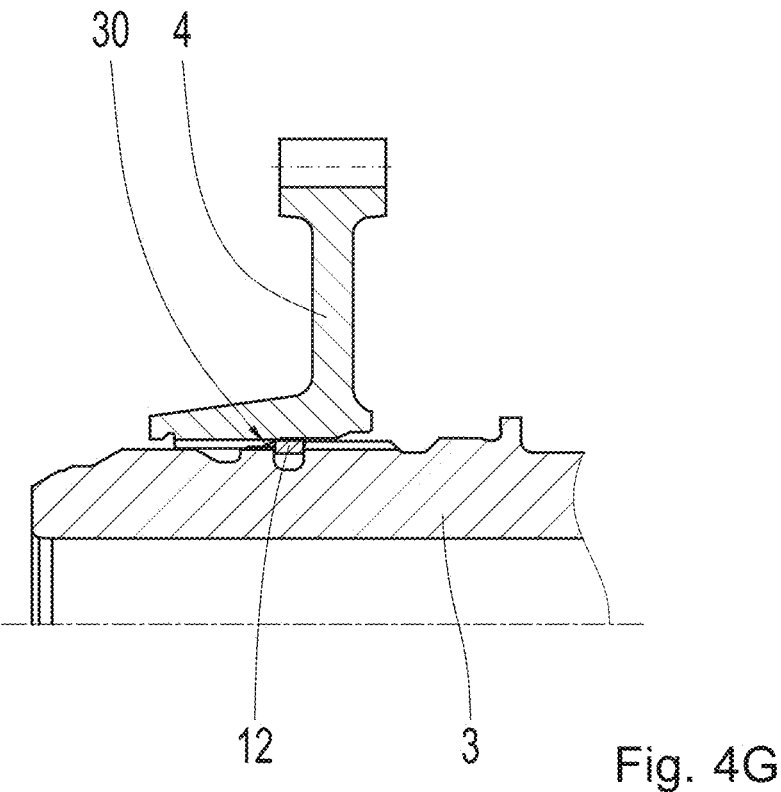
Figure 4H:
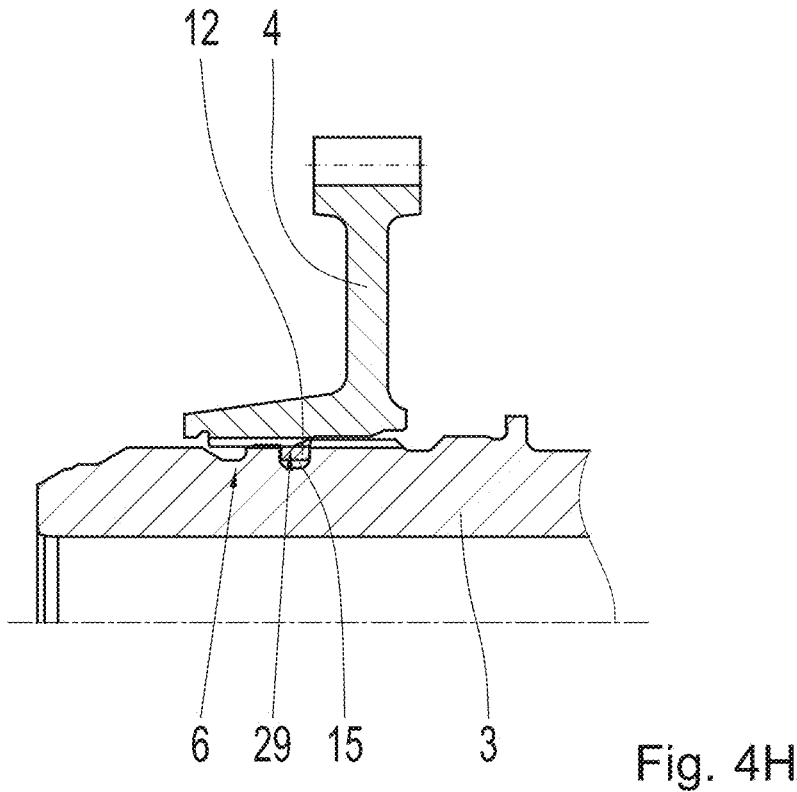
Figure 4I:
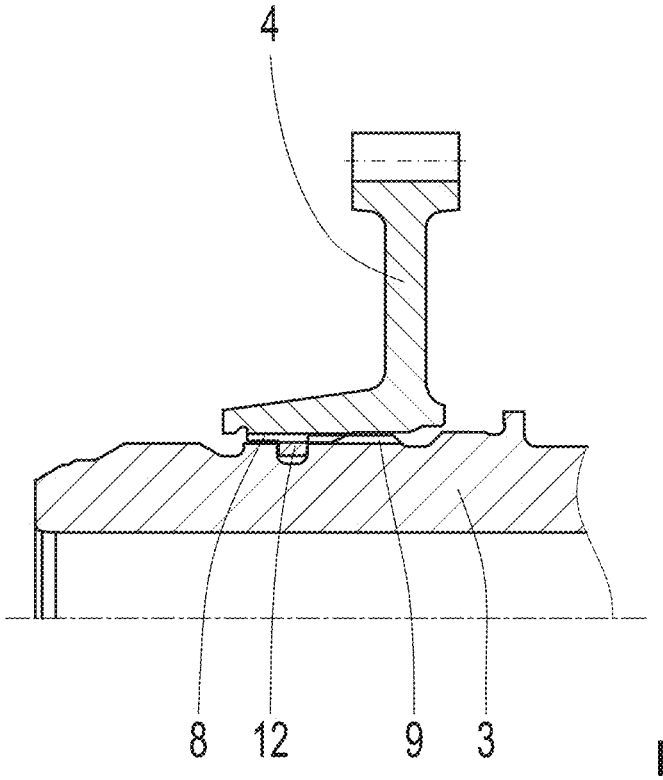

As the displacement continues, the snap ring 12 is then moved on the part of the guide region 6 along the bevel 27 (FIG. 4D) onto the centering section 26 (FIG. 4E), whereupon, as the displacement of the parking lock gear 4 continues, the snap ring 12 axially moves along the bevel 30 onto the installation section 29 of the guide region 6 (FIGS. 4F to 4H). The example embodiment is characterized in that the driving tooth system section 9b is threaded in first before the bevel 30 comes into contact with the snap ring 12 (FIG. 4F). Once the snap ring 12 has been axially positioned on the installation section 29, the snap ring 12 radially plunges completely into the receiving groove 15.

Figure 4J:
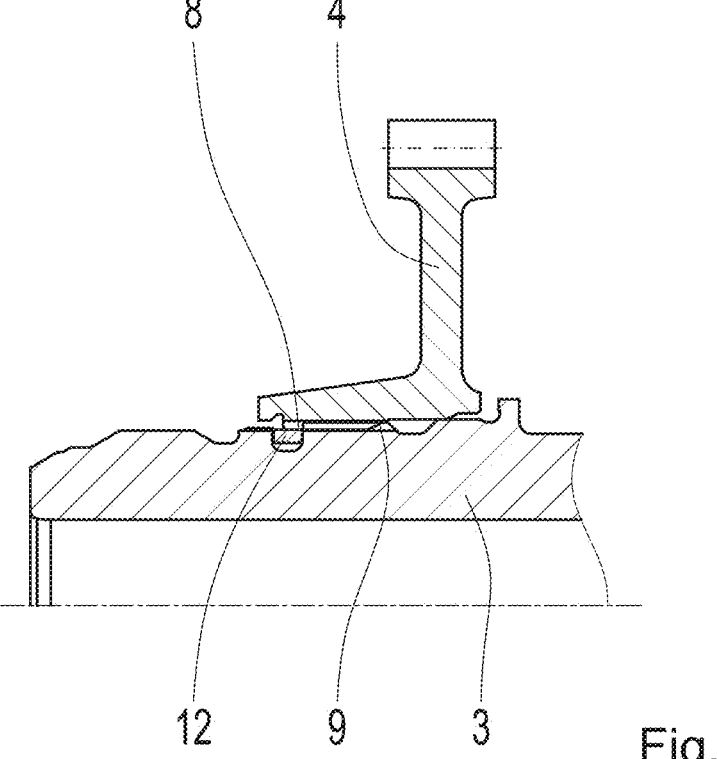
Figure 4K:
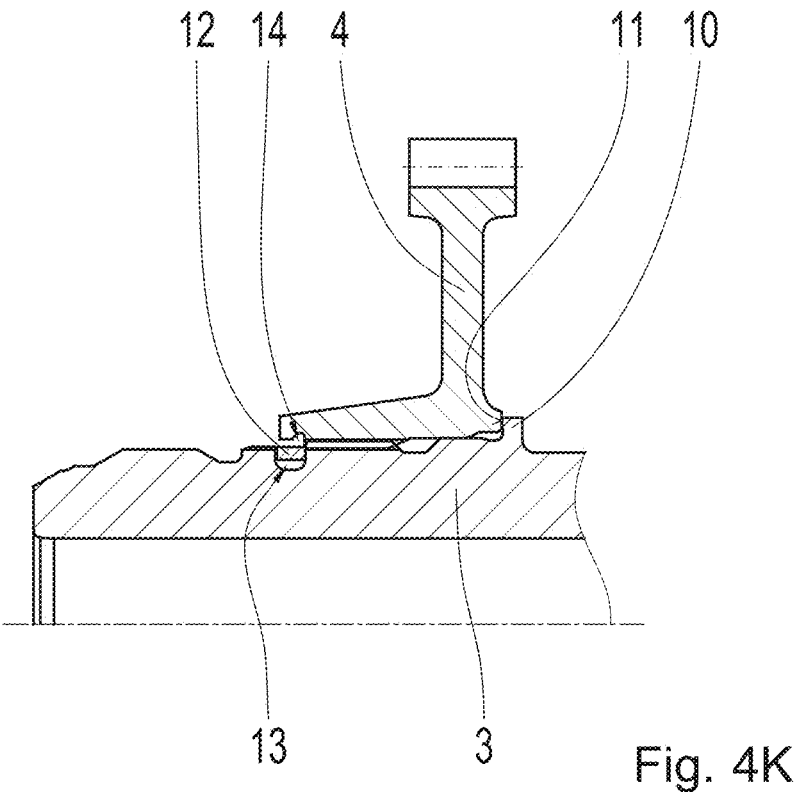
Figure 4L:
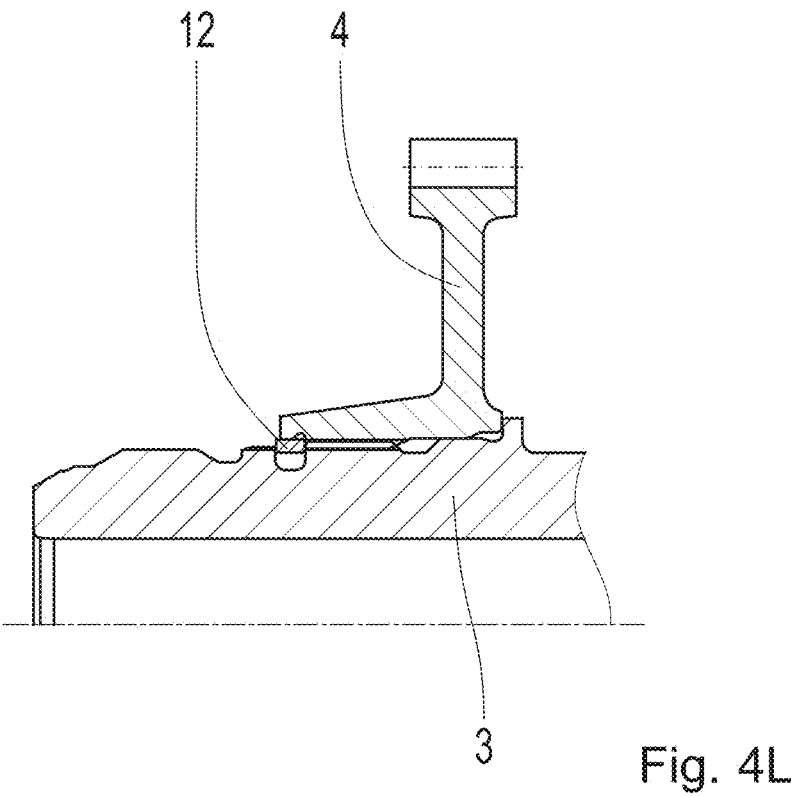

The parking lock gear 4 is then axially displaced further towards the final position, wherein the driving tooth systems 8 and 9 first engage with each other and then come into increasing overlap with each other (FIGS. 41 and 4J). When the parking lock gear 4 comes to rest axially against the abutment shoulder 11 of the shaft shoulder 10, the final position of the parking lock gear 4 on the transmission shaft 3 is reached, wherein the recess 13 in the transmission shaft 3 then axially overlaps with the recess 14 in the parking lock gear 4 (see FIG. 4K). In this position, the snap ring 12, which is then preloaded in a radially outward direction, can expand radially and transition into the securing position thereof, in which the snap ring axially secures the parking lock gear 4 on the transmission shaft 3 in the one axial direction (see FIG. 4L).

Figure 5:
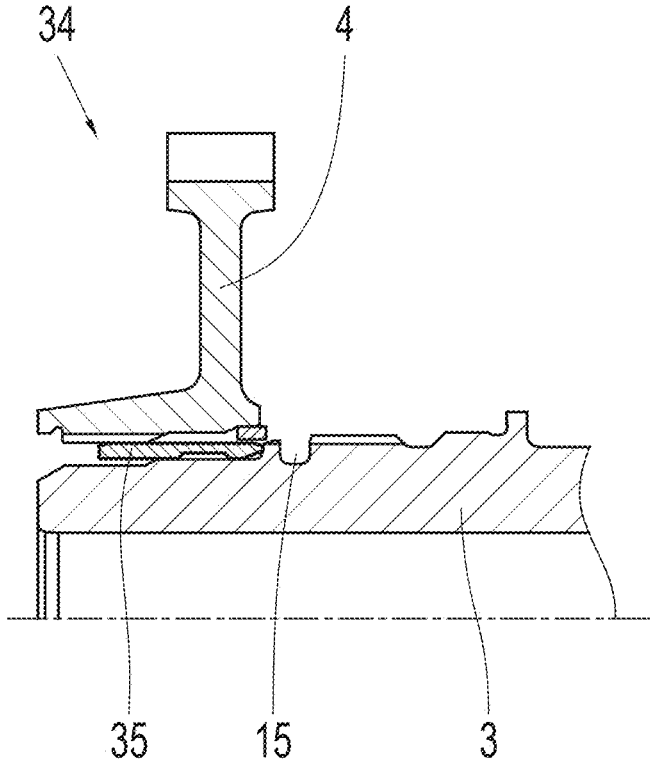
FIG. 5 shows a sectional view of one step to assemble a parking lock arrangement according to a further example design option of the invention.

FIG. 5 shows a sectional view of a region of a parking lock arrangement 34 according to a further example design option of the invention at the beginning of an assembly process. The parking lock arrangement 34 largely corresponds to the example variant according to FIGS. 1 to 4L, with the difference that, on the part of the transmission shaft 3, there is no centering section positioned upstream from the receiving groove 15 in the slide-on direction in this case. Instead, a separate installation centering sleeve 35 is used at the beginning of a process of assembling the parking lock arrangement 34 to center the parking lock gear 4 on the transmission shaft 3, which separate installation centering sleeve is then removed in the course of assembling the parking lock arrangement 34. For the rest, the parking lock arrangement 34 corresponds, with respect to the design and the assembly thereof, to the example variant as shown in FIGS. 1 to 4L, and so reference is made to the description thereof.

Figure 6:
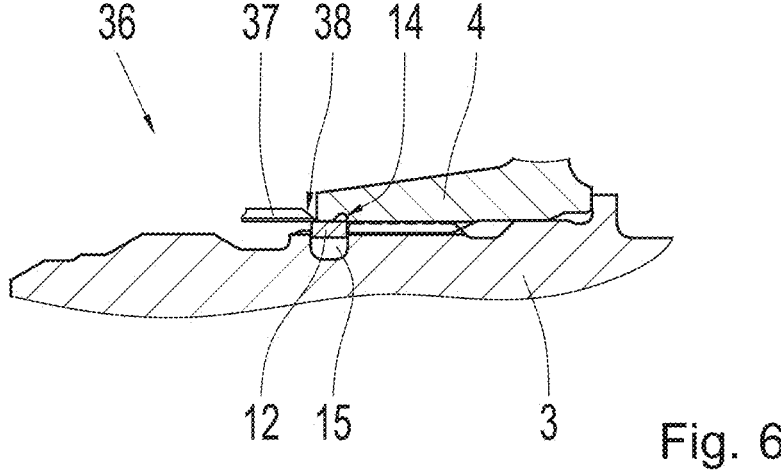
FIG. 6 shows a sectional view of a step to disassemble a parking lock arrangement according to a further example embodiment of the invention.

FIG. 6 shows a region of a parking lock arrangement 36 at the beginning of a process of disassembling the parking lock gear from the transmission shaft 3, wherein the parking lock arrangement 36 is designed according to a further example embodiment of the invention and also essentially corresponds to the example variant shown in FIGS. 1 to 4L. For the disassembly, the snap ring 12 of the parking lock arrangement 36 is depressed into the receiving groove 15 using a tool 37 and thus the axial securing via the snap ring 12 is released, such that the parking lock gear 4 can then be pulled off the transmission shaft 3 in the axial direction. For this purpose, the snap ring 12 is acted upon using the tool 37 in an axial direction from the open side of the recess 14. The tool 37 can be an assembly pin, such as a pry bar, or also a sleeve. In order to facilitate the access to the snap ring 12 using the tool 37 from the axial side, the parking lock gear 4 is provided with a bevel 38 on this axial end. For the rest, the example embodiment corresponds to the example variant according to FIGS. 1 to 4L, and so reference is made to the description thereof. Apart from the provided bevel 38, disassembly could be correspondingly achieved in the example embodiment according to FIGS. 1 to 4L.

Figure 7:
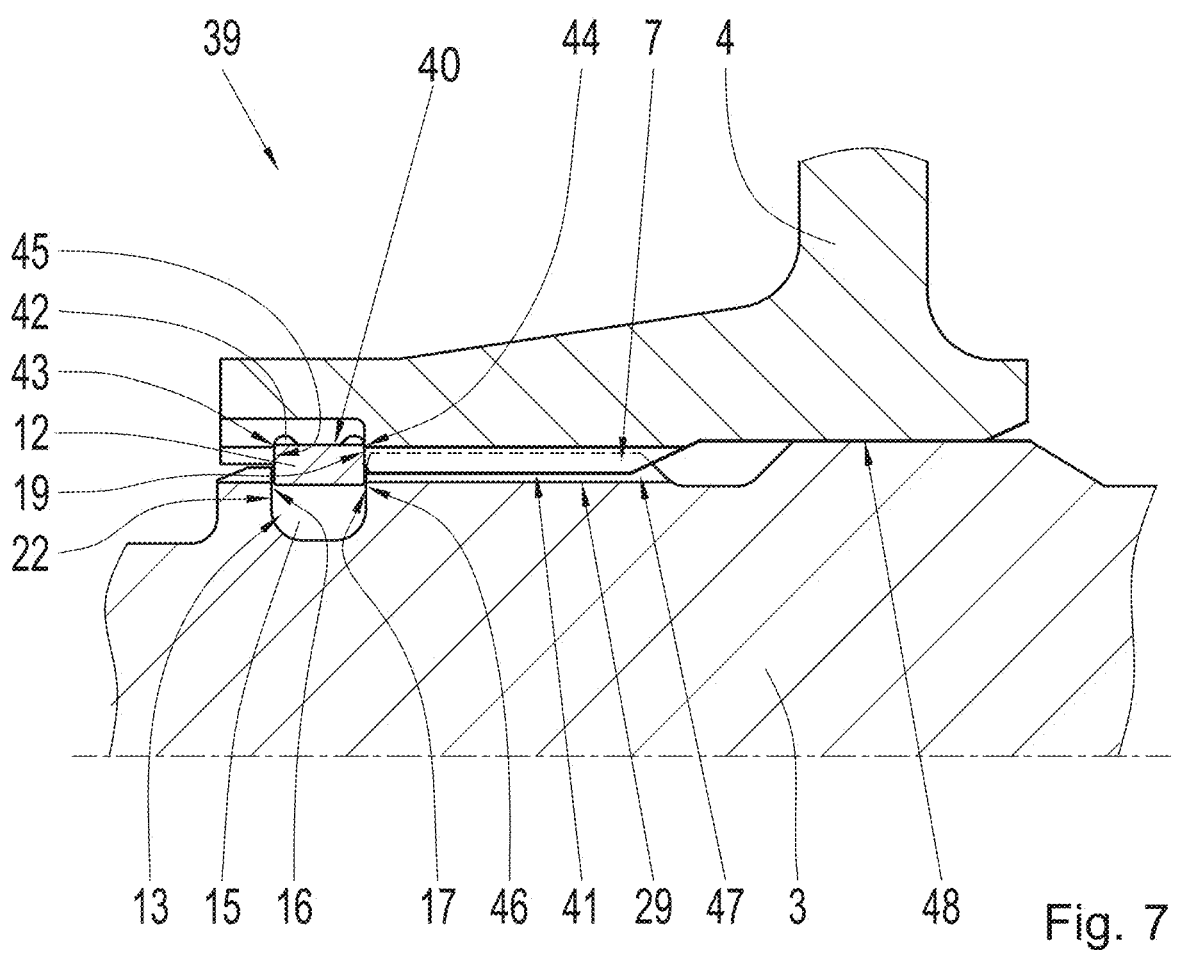
FIG. 7 shows a sectional view of a region of a parking lock arrangement according to a further example design option of the invention.

Furthermore, FIG. 7 shows a sectional view of a region of a parking lock arrangement 39 which is designed according to a further example design option of the invention and also largely corresponds to the example variant according to FIGS. 1 to 4L. The example design option according to FIG. 7 differs from the example variant according to FIGS. 1 to 4L in that a shaft shoulder, which forms an abutment shoulder for the parking lock gear 4, is not formed on the transmission shaft 3. Due to this omission of the abutment shoulder, the parking lock gear 4 is then axially secured on the transmission shaft 3 in both axial directions via the snap ring 12, for the purpose of which a recess 40 in a radially inward guide region 41 of the parking lock gear 4 is designed differently. The recess 40 is in the form of a groove 42 which extends peripherally around the guide region 41 and is axially delimited on both sides by groove flanks 43 and 44. In interaction with the groove flanks 16 and 17 of the receiving groove 15, corresponding support shoulders 19, 22, 45 and 46 are formed on both sides of the snap ring 12 in the axial direction on the part of the guide region 7 of the transmission shaft 3 and on the part of the guide region 41 of the parking lock gear 4. As a result, the parking lock gear 4 can be axially secured in the final position on the transmission shaft 3 solely via the snap ring 12.

As a further difference, an installation contour 47 of the guide region 41 also has, in addition to the installation section 29, a pre-installation section 48 which, similarly to the example variant according to FIGS. 1 to 4L, is provided for accommodating the snap ring 12 at the beginning of a process of assembling the parking lock arrangement 39, although also acting simultaneously as a centering section. Otherwise, the example design option according to FIG. 7 corresponds to the example variant according to FIGS. 1 through 4L, and therefore reference is made to the description thereof.

Figure 8:
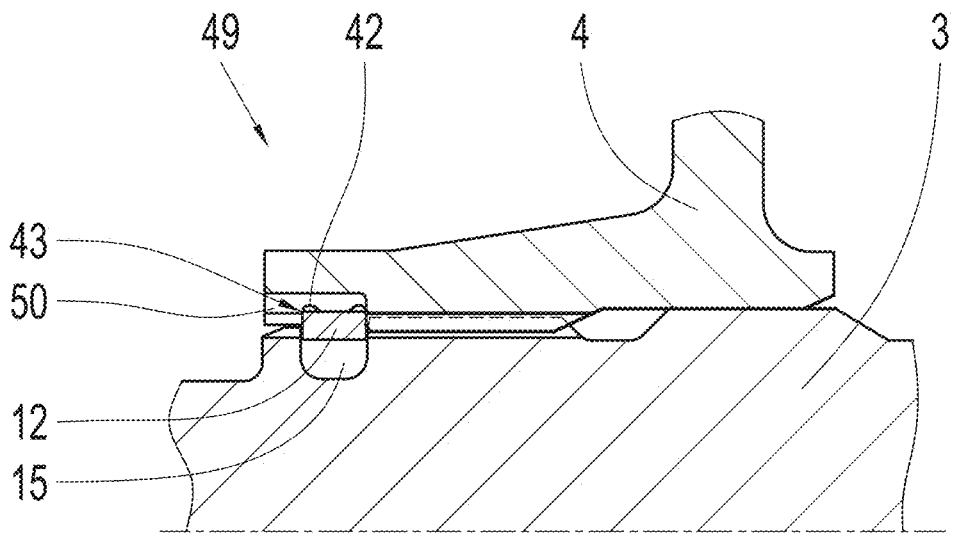
FIG. 8 shows a sectional view of a region of a parking lock arrangement according to a further example embodiment of the invention.
Figure 9:
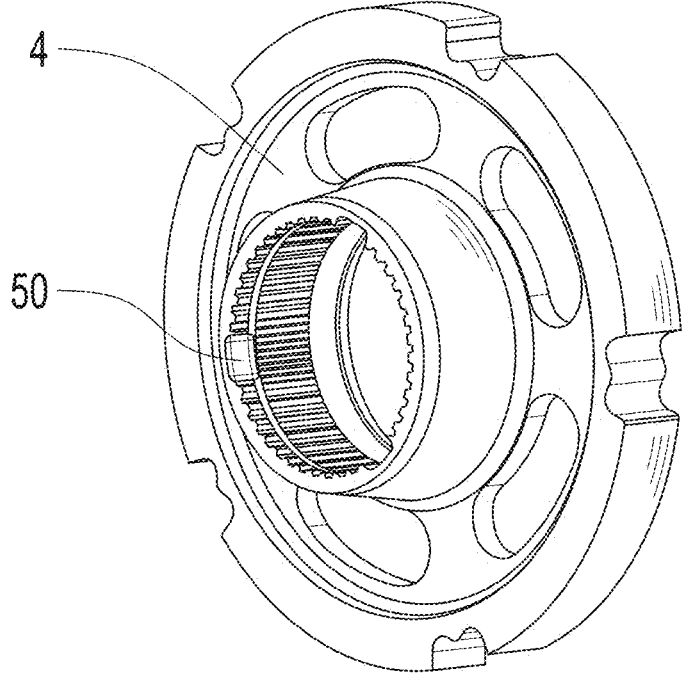
FIG. 9 shows a perspective view of a parking lock gear of the parking lock arrangement from FIG. 8.

FIG. 8 shows a parking lock arrangement 49 according to a further example embodiment of the invention. This example embodiment largely corresponds to the preceding example variant according to FIG. 7, with the difference that the groove flank 43 of the groove 42 is interrupted in some areas in the circumferential direction. These interruptions are formed by forged pockets 50, each of which is introduced from the axial end of the parking lock gear 4 and are also apparent, in particular, in the perspective single view of the parking lock gear 4 in FIG. 9. For the rest, the example embodiment according to FIG. 8 corresponds to the preceding example variant according to FIG. 7, and so reference is made to the description thereof.

Figure 10:
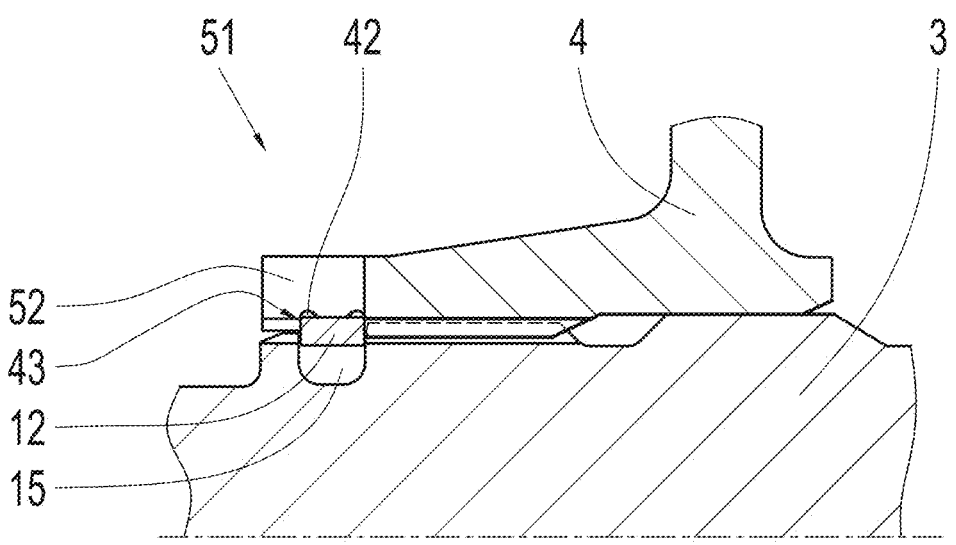
FIG. 10 shows a sectional view of a region of a parking lock arrangement according to a further example design option of the invention.
Figure 11:
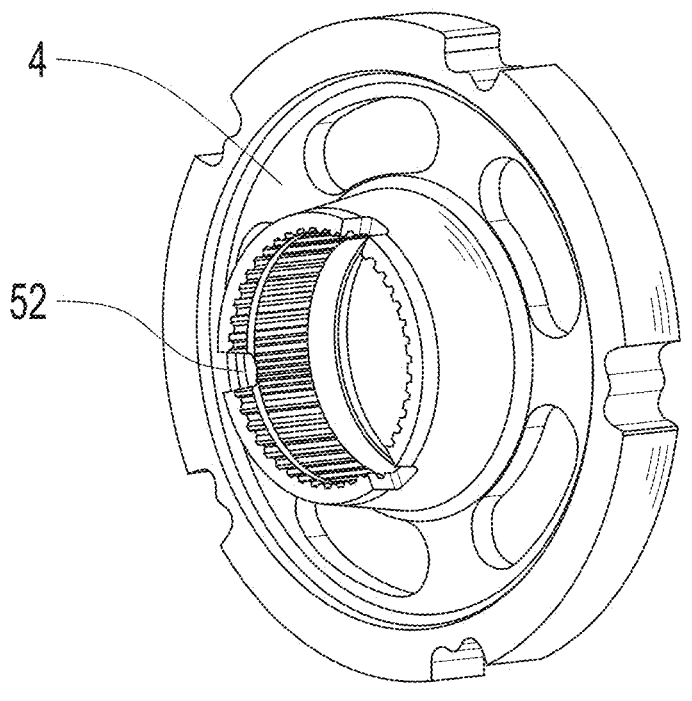
FIG. 11 shows a perspective view of a parking lock gear of the parking lock arrangement from FIG. 10.

In a parking lock arrangement 51 according to example aspects of the invention shown in FIG. 10, the groove flank 43 of the groove 42 is also interrupted in some areas in the circumferential direction, wherein this is achieved using open segments 52 in this case, however. These open segments 52 are also apparent, in particular, in the perspective single view of the parking lock gear 4 in FIG. 11. For the rest, the example variant according to FIG. 10 corresponds to the example variant according to FIG. 7, and so reference is made to the description thereof.

Figure 12:
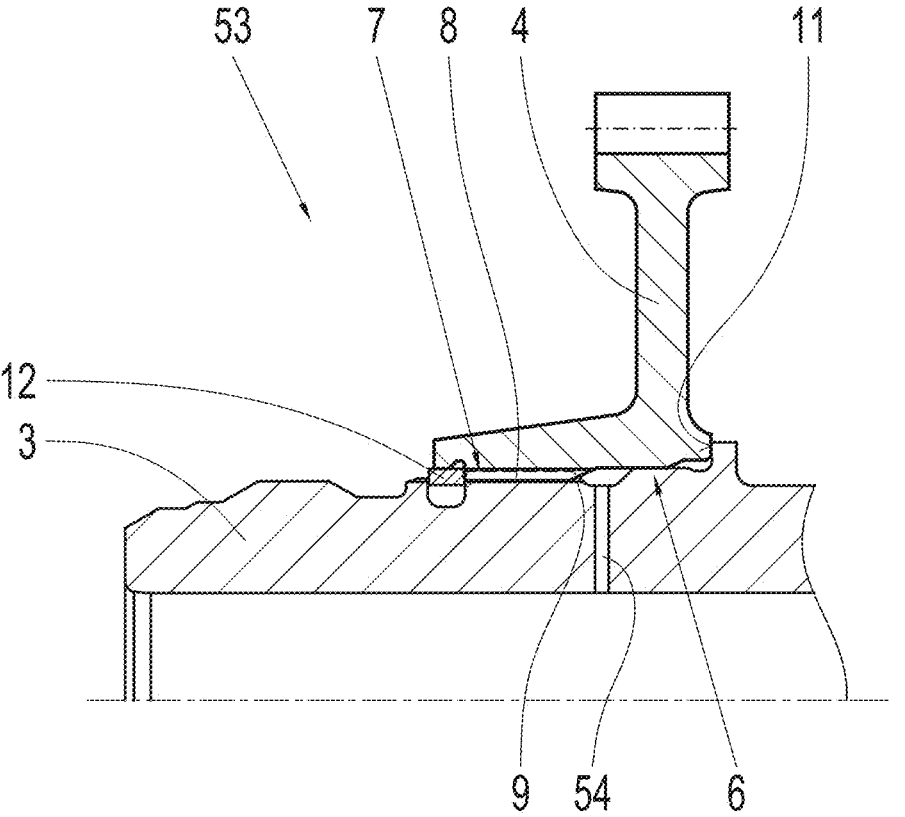
FIG. 12 shows a sectional view of a region of a parking lock arrangement according to a further example embodiment of the invention.

In addition, FIG. 12 shows a sectional view of a region of a parking lock arrangement 53 according to example aspects of the invention, which largely corresponds to the example variant according to FIG. 5. The parking lock arrangement 53 differs from the parking lock arrangement 34 according to FIG. 5 in that the transmission shaft 3 is also provided with a radially extending supply bore 54 which, on the transmission shaft 3, opens in a radially outward direction into the guide region 7 of the transmission shaft 3. Thereby, lubricant, preferably in the form of oil, can be directed radially into the region between the guide region 7 of the transmission shaft 3 and the guide region 6 of the parking lock gear 4 in order to appropriately lubricate the tooth engagements of the driving tooth systems 8 and 9. After the tooth engagements are supplied, the lubricant can then flow in the axial direction towards the outside via the snap ring 12, in order to supply a further component, if necessary. This design could also be implemented in the example embodiments described above. For the rest, the example embodiment according to FIG. 12 corresponds to the example variant according to FIG. 5, and so reference is made to the description thereof. Alternatively, a lubricant feed could also be implemented radially from the outside via the region of the snap ring 12 and/or via the contact of the parking lock gear 4 against the abutment shoulder 11.

Figure 13:
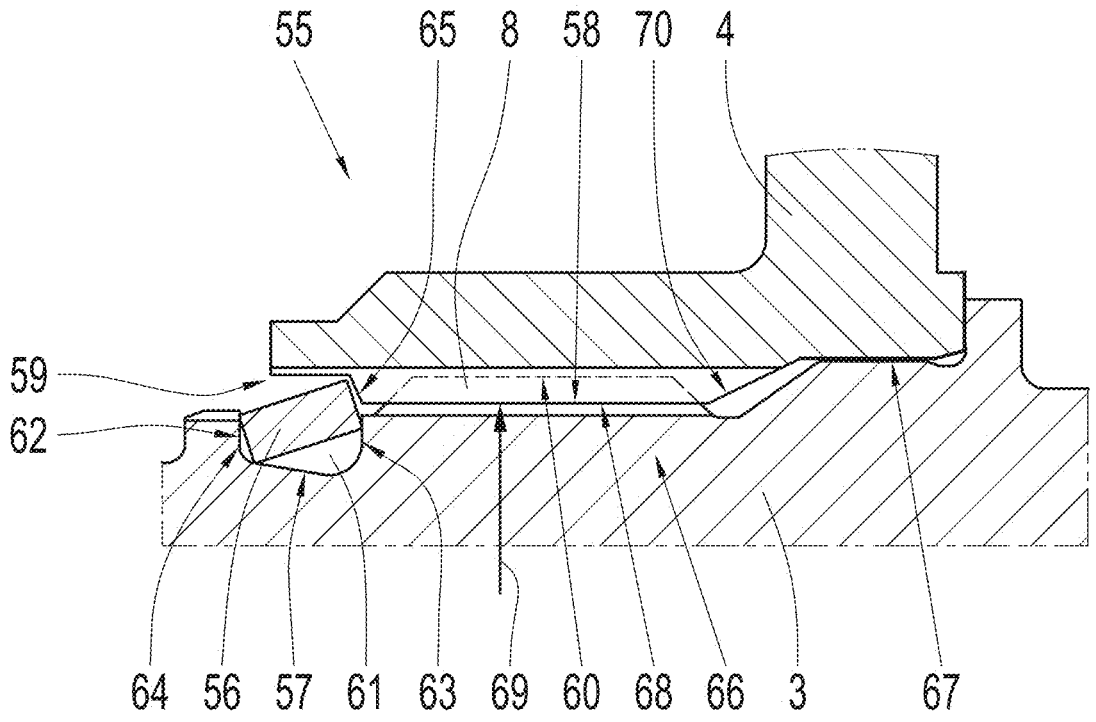
FIG. 13 shows a sectional view of a region of a parking lock arrangement according to a further example design option according to the invention.

FIG. 13 shows a sectional view of a region of a parking lock arrangement 55 which is designed according to a further example embodiment of the invention and largely corresponds to the example variant according to FIGS. 1 to 4L. The parking lock arrangement 55 differs from the example variant according to FIGS. 1 to 4L in that a rectangular cross-sectional geometry of a snap ring 56 extends obliquely, in that the cross-sectional geometry is defined by a first side and a second side, of which the first side extends in the radial direction and by a greater extent in comparison thereto in the axial direction, whereas the second side extends orthogonal with respect to the first side and is shorter than the first side. The snap ring 56, which has been preloaded as a result, secures the parking lock gear 4 on the transmission shaft 3 in an axial direction in the final position shown, in that the snap ring 56 engages radially partially into a recess 57 in a guide region 58 of the transmission shaft 3 and radially partially into a recess 59 in a guide region 60 of the parking lock gear 4.

The recess 57 is designed again as a receiving groove 61 which is axially delimited on both sides by groove flanks 62 and 63. The groove flank 63 has a shape, in sections, which varies in the axial direction and in the radial direction. By the groove flank 62, a support shoulder 64 is formed, against which the snap ring 56 axially rests in the securing position thereof, wherein an opposite support shoulder 65 is then defined on the part of the guide region 60.

The guide region 60 also defines an installation contour 66 which is formed by a centering section 67 and an installation section 68. In the slide-on direction of the parking lock gear 4 onto the transmission shaft 3, the installation section 68 is positioned upstream from the recess 59 and axially adjacent thereto, wherein the driving tooth system 8 is also formed on the installation section 68. In addition, the installation section 68 has an installation diameter 69.

Likewise in contrast to the example variant according to FIGS. 1 to 4L, the parking lock arrangement 55 is assembled by first placing the snap ring 56 is into the receiving groove 61 and then axially sliding the parking lock gear 4 onto the transmission shaft 3 towards the final position. At a certain displacement, the snap ring 56 first comes into contact with the bevel 70 in a radially outward direction, which bevel forms a transition from the centering section 67 onto the installation section 68. As a result, the snap ring 56 is increasingly preloaded radially into the receiving groove 61, wherein the snap ring 56 radially plunges completely into the receiving groove 57 once it axially overlaps with the installation section 68 due to the configuration of the installation diameter 69.

The parking lock gear 4 can then be displaced into the final position, wherein, in the final position, the recesses 57 and 59 axially overlap and the snap ring 56 can expand in a radially outward direction into the securing position shown in FIG. 13. For the rest, the example embodiment according to FIG. 13 corresponds to the example variant according to FIGS. 1 to 4L, and so reference is made to the description thereof.

Figure 14:
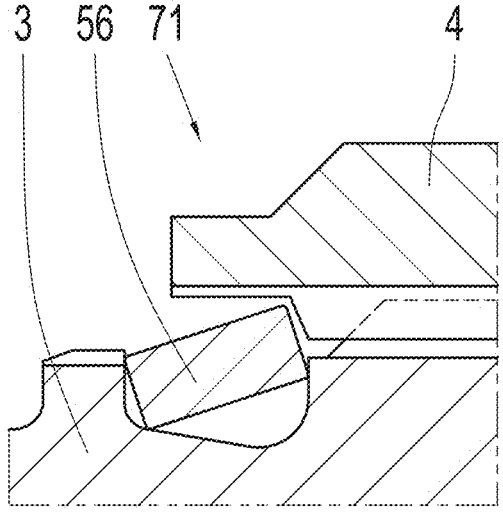
FIG. 14 shows a sectional view of a region of a parking lock arrangement according to a further example embodiment of the invention.

In addition, FIG. 14 shows a sectional view of a region of a parking lock arrangement 71 according to example aspects of the invention, which largely corresponds to the preceding example variant according to FIG. 13. The only difference is that the snap ring 56, as a bore ring, preloads in a radially outward direction against the parking lock gear 4. For the rest, the example embodiment according to FIG. 14 corresponds to the example variant according to FIG. 13, and so reference is made to the description thereof.

Figure 15:
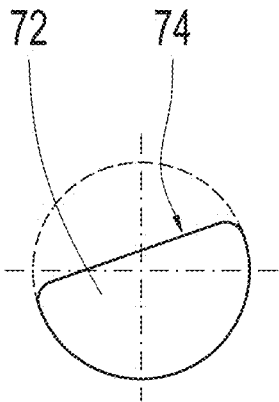
FIGS. 15 and 16 show sectional views of alternative example design options of a snap ring.
Figure 16:
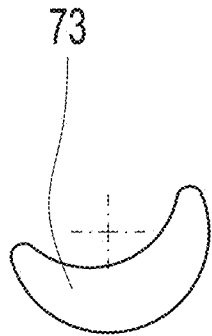

Finally, FIGS. 15 and 16 each show alternative example cross-sectional geometries of a snap ring 72 and 73, respectively, of the type that can be used in the above-described variants. In the snap ring 72, the cross-sectional geometry is formed by a flattened circle, wherein a flattening 74 of the circle extends at least largely in the axial direction. In the snap ring 73 according to FIG. 16, however, the cross-sectional geometry is crescent-shaped, wherein tips of the crescent-shaped cross-sectional geometry are oriented at least predominantly in the radial direction.

By the example embodiments according to the invention, a parking lock arrangement can be achieved in each case, in which a parking lock gear is reliably axially secured via a snap ring in a radially compact manner.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 parking lock arrangement
2 component
3 transmission shaft
4 parking lock gear
5 hub section
6 guide region
7 guide region
8 driving tooth system
9 driving tooth system
9a driving tooth system section
9b driving tooth system section
10 shaft shoulder
11 abutment shoulder
12 snap ring
13 recess
14 recess
15 receiving groove
16 groove flank
17 groove flank
18 projection
19 support shoulder
20 undercut
21 contact surface
22 support shoulder
23 installation contour
24 pre-installation section
25 pre-installation diameter
26 centering section
27 bevel
28 centering diameter
29 installation section
30 bevel 31 installation diameter
32 centering section
33 centering section
34 parking lock arrangement
35 installation centering sleeve
36 parking lock arrangement
37 tool
38 bevel
39 parking lock arrangement
40 recess
41 guide region
42 groove
43 groove flank
44 groove flank
45 support shoulder
46 support shoulder
47 installation contour
48 pre-installation section
49 parking lock arrangement
50 forged pockets
51 parking lock arrangement
52 open segments
53 parking lock arrangement
54 supply bore
55 parking lock arrangement
56 snap ring
57 recess
58 guide region
59 recess
60 guide region
61 receiving groove
62 groove flank
63 groove flank
64 support shoulder
65 support shoulder
66 installation contour
67 centering section
68 installation section
69 installation diameter
70 bevel
71 parking lock arrangement
72 snap ring
73 snap ring
74 flattening

The invention claimed is:

1. A parking lock arrangement (1; 34; 36; 39; 49; 51; 53; 55; 71) for a motor vehicle transmission, comprising:

a parking lock gear (4) arranged on a component (2) in a final position, the component (2) including a transmission shaft (3), the parking lock gear (4) is configured for sliding onto a guide region (7; 58) defined on a radially outward side of the component (2) via a guide region (6; 41; 60) formed on a radially inward side of the parking lock gear (4), a recess (14; 40; 59) extending peripherally around the guide region (6; 41; 60) of the parking lock gear (4) being in axial overlap with a recess (13; 57) extending peripherally around the guide region (7; 58) of the component (2) when the parking lock gear (4) is in the final position; and a securing ring, wherein, in the final position, the parking lock gear (4) and the component (2) are securable against each other in at least one axial direction by the securing ring positioned radially between the parking lock gear (4) and the component (2), wherein, in a securing position of the securing ring, the securing ring is configured to engage partially radially into the recess (14; 40; 59) in the guide region (6; 41; 60) on the parking lock gear (4) and partially radially into the recess (13; 57) in the guide region (7; 58) on the component (2), wherein the securing ring comprises a snap ring (12; 56; 72; 73), the snap ring (12; 56; 72; 73) being slotted and radially elastic, and a cross-sectional geometry of the snap ring (12; 56; 72; 73) being greater in an axial extension than in a radial extension, and wherein the parking lock gear (4) in the final position rests in a first axial direction against an abutment shoulder (11) that extends in a radially outward direction and peripherally around the component (2), the parking lock gear (4) blocked from migrating out of the final position in a second axial direction, in that, when the parking lock gear (4) migrates in the second axial direction, the snap ring (12; 56) abuts against one first support shoulder (22; 64) formed by the recess (13; 57) in the component (2) facing axially towards the abutment shoulder and against one second support shoulder (19; 65) formed by the recess (14; 59) in the parking lock gear (4) facing axially in the second axial direction.

2. The parking lock arrangement (1; 34; 36; 39; 49; 51; 53; 55; 71) of claim 1, wherein, in one (7; 58) of the guide regions (6, 7; 7, 41; 58, 60), the recess (13; 57) comprises a receiving groove (15; 61) axially delimited on both sides and dimensioned for the snap ring (12; 56) to plunge completely into the receiving groove (15; 61) by radial preloading into an installation position.

3. The parking lock arrangement (1; 34; 36; 39; 49; 51; 53) of claim 2, wherein:

the other guide region (6; 41) also defines an installation contour (23; 47) for the snap ring (12) with an axial pre-installation section (24; 48) having a pre-installation diameter (25), the pre-installation diameter (25) is configured to accommodate the snap ring (12) on the other guide region (6; 41) in a pre-installation position, in the installation contour (23; 47), an axial installation section (29) is defined in an axial slide-on direction in which the parking lock gear (4) is to be axially slid onto the component (2) into the final position, downstream from the axial pre-installation section (24; 48) and upstream from the recess (14; 40) in the other guide region (6; 41), the axial installation section including an installation diameter (31) configured for effecting a radial preloading of the snap ring (12) in the installation position of the snap ring (12) when the snap ring (12) is axially positioned on the axial installation section (29), and a second groove flank (17) of the receiving groove (15) disposed axially in the axial slide-on direction includes a radial extension at which the snap ring (12) radially overlaps with the second groove flank (17) when the snap ring (12) is in the pre-installation position such that as the parking lock gear (4) slides onto the component (2) into the final position, the snap ring (12) is configured for accommodation on the axial pre-installation section (24; 48) to rest axially against the second groove flank (17) and axially move during further sliding-on of the parking lock gear (4) from the axial pre-installation section (24; 48) onto the axial installation section (29) and therefore radially preload into the installation position in the receiving groove (15).

4. The parking lock arrangement (1; 34; 36; 39; 49; 51; 53; 55; 71) of claim 3, wherein the recess (14; 40; 59) in the other guide region (6; 41; 60) directly follows the axial installation section (29; 68) in the axial direction.

5. The parking lock arrangement (1; 34; 36; 39; 49; 51; 53; 55; 71) of claim 3, wherein a respective transition between axially adjacent sections of the installation contour (23; 47; 66) are each formed as a bevel (27; 30; 70).

6. The parking lock arrangement (1; 34; 36; 39; 49; 51; 53; 55; 71) of claim 5, wherein the parking lock arrangement is configured such that, during assembly, a driving tooth system section (9b) is threaded first before the bevel (30) contacts the snap ring (12).

7. The parking lock arrangement (1; 34; 36) of claim 6, wherein:

the parking lock arrangement is configured such that, during assembly, the driving tooth system section (9b) is threaded first before the bevel (30) contacts the snap ring (12); and a centering section (26) of the other guide region (6) is defined with respect to the installation contour (23) axially between the axial pre-installation section (24) and the axial installation section (29), the centering section (26) having a centering diameter (28) lying between the pre-installation diameter (25) and the installation diameter (31).

8. The parking lock arrangement (1; 34; 36; 39; 49; 51; 53; 55; 71) of claim 3, wherein the other guide region (6; 41; 60) is provided with a driving tooth system (8) on the axial installation section (29; 68), the driving tooth system configured as a counterpart to a driving tooth system (9) provided on the one guide region (7; 58) axially next to the receiving groove (15; 61) and meshed with the driving tooth system (8) of the other guide region (6; 41; 60) in the final position.

9. The parking lock arrangement (55; 71) of claim 2, wherein:

the receiving groove (61) is configured to receive the snap ring (56) in a pre-installation position in which the snap ring (56) is axially positioned between a first groove flank (62) and a second groove flank (63) axially delimiting the receiving groove (61) and radially protrudes partially into the receiving groove (61), the other guide region (60) defines an installation contour (66) for the snap ring (56), the installation contour having an axial installation section (68) positioned upstream from the recess (59) in the other guide region (60) in an axial slide-on direction in which the parking lock gear (4) is axially slidable onto the component (2) into the final position, and the other guide region (60) also having an installation diameter (69) selected such that the snap ring (56), which is positioned axially between the first and second groove flanks (62, 63), radially preloads into the installation position in the receiving groove (61) when axially overlapping with the axial installation section (68) as the parking lock gear (4) slides onto the component (2).

10. The parking lock arrangement (55; 71) of claim 9, wherein the second groove flank (63) lying in the axial slide-on direction has a profile that changes in the axial direction and a radial direction.

11. The parking lock arrangement (1; 34; 36; 39; 49; 51; 53; 55; 71) of claim 1, wherein the guide regions (6, 7; 7, 41; 58, 60) of the parking lock gear (4) and of the component (2) are provided with centering sections (26, 32, 33; 32, 67) in the form of counterparts.

12. The parking lock arrangement (39; 49; 51) of claim 1, wherein the parking lock gear (4) is prevented from migrating out of the final position in both axial directions via the snap ring (12), for which the recesses (13, 40) in the parking lock gear (4) and in the component (2) are formed as grooves (15, 42), each of which is axially delimited on both sides by respective groove flanks (16, 17, 43, 44) acting as support shoulders (19, 22, 45, 46) for the snap ring (12), such that the snap ring (12) rests axially against one of the respective groove flanks (16, 17, 43, 44) of the respective groove (15, 42) depending on the respective axial direction of migration.

13. The parking lock arrangement (49; 51) of claim 12, wherein the groove (42) in the other guide region (6) is accessible from outside from one axial side, in that the groove flank (43) of the groove (42) lying on the axial side is interrupted in a circumferential direction.

14. A motor vehicle transmission, comprising the parking lock arrangement of claim 1.

15. The parking lock arrangement (1; 34; 36; 39; 49; 51; 53; 55; 71) of claim 1, wherein the transmission shaft (3) is an output shaft of the motor vehicle transmission.

16. The parking lock arrangement (1; 34; 36; 39; 49; 51; 53; 55; 71) of claim 1, wherein a driving tooth system (8) of the guide region (6; 41; 60) of the parking lock gear (4) meshes with a driving tooth system (9) of the guide region (7; 58) of the component (2) when the parking lock gear (4) is in the final position, and wherein the component (2) has one or more further gear teeth sections spaced apart from the driving tooth system (8) of the guide region (6; 41; 60) of the parking lock gear (4).

17. The parking lock arrangement (1; 34; 36; 39; 49; 51; 53; 55; 71) of claim 1, wherein the cross-sectional geometry of the snap ring is constant.

18. A parking lock arrangement (1; 34; 36; 39; 49; 51; 53; 55; 71) for a motor vehicle transmission, comprising:

a parking lock gear (4) arranged on a component (2) in a final position, the component (2) including a transmission shaft (3), the parking lock gear (4) is configured for sliding onto a guide region (7; 58) defined on a radially outward side of the component (2) via a guide region (6; 41; 60) formed on a radially inward side of the parking lock gear (4), a recess (14; 40; 59) extending peripherally around the guide region (6; 41; 60) of the parking lock gear (4) being in axial overlap with a recess (13; 57) extending peripherally around the guide region (7; 58) of the component (2) when the parking lock gear (4) is in the final position; and a securing ring, wherein, in the final position, the parking lock gear (4) and the component (2) are securable against each other in at least one axial direction by the securing ring positioned radially between the parking lock gear (4) and the component (2), wherein, in a securing position of the securing ring, the securing ring is configured to engage partially radially into the recess (14; 40; 59) in the guide region (6; 41; 60) on the parking lock gear (4) and partially radially into the recess (13; 57) in the guide region (7; 58) on the component (2), wherein the securing ring comprises a snap ring (12; 56; 72; 73), the snap ring (12; 56; 72; 73) being slotted and radially elastic, and a cross-sectional geometry of the snap ring (12; 56; 72; 73) being greater in an axial extension than in a radial extension, wherein, in one (7; 58) of the guide regions (6, 7; 7, 41; 58, 60), the recess (13; 57) comprises a receiving groove (15; 61) axially delimited on both sides and dimensioned for the snap ring (12; 56) to plunge completely into the receiving groove (15; 61) by radial preloading into an installation position, wherein the other guide region (6; 41) also defines an installation contour (23; 47) for the snap ring (12) with an axial pre-installation section (24; 48) having a pre-installation diameter (25), wherein the pre-installation diameter (25) is configured to accommodate the snap ring (12) on the other guide region (6; 41) in a pre-installation position, wherein, in the installation contour (23; 47), an axial installation section (29) is defined in an axial slide-on direction in which the parking lock gear (4) is to be axially slid onto the component (2) into the final position, downstream from the axial pre-installation section (24; 48) and upstream from the recess (14; 40) in the other guide region (6; 41), wherein the axial installation section including an installation diameter (31) configured for effecting a radial preloading of the snap ring (12) in the installation position of the snap ring (12) when the snap ring (12) is axially positioned on the axial installation section (29), and wherein a second groove flank (17) of the receiving groove (15) disposed axially in the axial slide-on direction includes a radial extension at which the snap ring (12) radially overlaps with the second groove flank (17) when the snap ring (12) is in the pre-installation position such that as the parking lock gear (4) slides onto the component (2) into the final position, the snap ring (12) is configured for accommodation on the axial pre-installation section (24; 48) to rest axially against the second groove flank (17) and axially move during further sliding-on of the parking lock gear (4) from the axial pre-installation section (24; 48) onto the axial installation section (29) and therefore radially preload into the installation position in the receiving groove (15).

19. A parking lock arrangement (1; 34; 36; 39; 49; 51; 53; 55; 71) for a motor vehicle transmission, comprising:

a parking lock gear (4) arranged on a component (2) in a final position, the component (2) including a transmission shaft (3), the parking lock gear (4) is configured for sliding onto a guide region (7; 58) defined on a radially outward side of the component (2) via a guide region (6; 41; 60) formed on a radially inward side of the parking lock gear (4), a recess (14; 40; 59) extending peripherally around the guide region (6; 41; 60) of the parking lock gear (4) being in axial overlap with a recess (13; 57) extending peripherally around the guide region (7; 58) of the component (2) when the parking lock gear (4) is in the final position; and a securing ring, wherein, in the final position, the parking lock gear (4) and the component (2) are securable against each other in at least one axial direction by the securing ring positioned radially between the parking lock gear (4) and the component (2), wherein, in a securing position of the securing ring, the securing ring is configured to engage partially radially into the recess (14; 40; 59) in the guide region (6; 41; 60) on the parking lock gear (4) and partially radially into the recess (13; 57) in the guide region (7; 58) on the component (2), wherein the securing ring comprises a snap ring (12; 56; 72; 73), the snap ring (12; 56; 72; 73) being slotted and radially elastic, and a cross-sectional geometry of the snap ring (12; 56; 72; 73) being greater in an axial extension than in a radial extension, wherein a driving tooth system (8) of the guide region (6; 41; 60) of the parking lock gear (4) meshes with a driving tooth system (9) of the guide region (7; 58) of the component (2) when the parking lock gear (4) is in the final position, and wherein the component (2) has one or more further gear teeth sections spaced apart from the driving tooth system (8) of the guide region (6; 41; 60) of the parking lock gear (4).

\* \* \* \* \*